(12) United States Patent
Kikuchi

(10) Patent No.: US 8,462,453 B2
(45) Date of Patent: Jun. 11, 2013

(54) MAGNETIC TRANSFER METHOD AND MAGNETIC TRANSFER DEVICE

(75) Inventor: Hiroto Kikuchi, Matsumoto (JP)

(73) Assignee: Fuji Electric Co., Ltd., Kawasaki-Shi (JP)

(*) Notice: Subject to any disclaimer, the term of this patent is extended or adjusted under 35 U.S.C. 154(b) by 316 days.

(21) Appl. No.: 13/025,848

(22) Filed: Feb. 11, 2011

(65) Prior Publication Data

US 2011/0242690 A1  Oct. 6, 2011

(30) Foreign Application Priority Data

Mar. 30, 2010 (JP) ................................. 2010-078637

(51) Int. Cl.
*G11B 5/86* (2006.01)
(52) U.S. Cl.
USPC .................. 360/17; 360/15; 360/16; 360/18; 360/62; 360/77.02
(58) Field of Classification Search
None
See application file for complete search history.

(56) References Cited

U.S. PATENT DOCUMENTS

| | | | | |
|---|---|---|---|---|
| 6,636,371 B1* | 10/2003 | Komatsu et al. | ................ | 360/16 |
| 6,747,823 B2* | 6/2004 | Saito et al. | ................ | 360/17 |
| 6,914,735 B2* | 7/2005 | Hamada et al. | ................ | 360/17 |
| 6,950,254 B2* | 9/2005 | Suzuki et al. | ................ | 360/17 |
| 6,954,317 B2* | 10/2005 | Aoki et al. | ................ | 360/17 |
| 6,980,380 B2* | 12/2005 | Miyata et al. | ................ | 360/17 |
| 7,099,094 B2* | 8/2006 | Nakamura et al. | ................ | 360/17 |
| 7,369,337 B2* | 5/2008 | Fujisawa | ................ | 360/17 |
| 8,208,211 B2* | 6/2012 | Kikuchi | ................ | 360/17 |
| 8,208,212 B2* | 6/2012 | Sato | ................ | 360/17 |
| 2002/0034107 A1 | 3/2002 | Saito | | |
| 2002/0080507 A1 | 6/2002 | Taniguchi et al. | | |
| 2003/0189775 A1* | 10/2003 | Komatsu et al. | ................ | 360/17 |

FOREIGN PATENT DOCUMENTS

| | | |
|---|---|---|
| JP | 2002-083421 A | 3/2002 |
| JP | 2002-237031 A | 8/2002 |

* cited by examiner

*Primary Examiner* — Dismery Mercedes
(74) *Attorney, Agent, or Firm* — Rabin & Berdo, P.C.

(57) ABSTRACT

A system and method for magnetic transfer. A magnetic transfer device includes a plurality of pairs of magnetic field generating units that apply a magnetic field to a contact body which includes a master disk in close contact with a magnetic recording medium, wherein the master disk has a pattern of preformatted signals. The magnetic field generating units, falling within a specified length range, are moved in synchrony at a predetermined speed in the directions of the outer periphery while the contact body is caused to rotate by a rotation drive unit. The system and method provide a magnetic transfer method and a magnetic transfer device that, by reducing the area of magnetic field generating units that apply a transfer magnetic field, can reduce an attractive force (or repulsive force) between the magnets, and furthermore, shorten a processing time for the transfer.

18 Claims, 22 Drawing Sheets

# MAGNETIC TRANSFER METHOD AND MAGNETIC TRANSFER DEVICE

BACKGROUND OF THE INVENTION

1. Technical Field

The present invention relates to a magnetic transfer method and magnetic transfer device that transfer preformatted information to a magnetic recording medium using a master disk having a ferromagnetic material pattern corresponding to preformatted signals.

2. Related Art

In a general hard disk drive device, a magnetic head is caused to fly around 10 nm above a magnetic recording medium, and a data read/write is carried out. Bit information on the magnetic recording medium is stored in concentrically disposed data tracks. The magnetic head is positioned above the data tracks when reading or writing data. Servo information for the positioning is recorded concentrically with the data tracks at constant angle intervals on the magnetic recording medium. As preformatted signals including this kind of servo information are generally recorded using the magnetic head, a problem has occurred in that a write time has increased along with an increase in recording tracks in recent years, and the production efficiency of the magnetic recording medium has dropped. For this reason, a method has been proposed whereby, instead of writing the preformatted signals using the magnetic head, the preformatted signals are recorded en bloc on the magnetic transfer medium by means of a magnetic transfer technique, using a master disk on which the preformatted signals are recorded. For example, a method is known whereby, using a master disk on which is formed a ferromagnetic material pattern corresponding to the preformatted signals, the preformatted signals of the master disk are transferred to a perpendicular recording medium (for example, refer to JP-A-2002-083421).

Herein, referring to FIG. 21, a description will be given of the principal of a magnetic transfer from a master disk to a medium to be transferred. An convex-concave pattern 105 formed from a ferromagnetic material is provided on a transfer master disk 101, and brought into close contact with a medium to be transferred 102. On applying an external magnetic field 106 in a direction parallel to a recording surface of the medium to be transferred 102, a leakage flux 107 enters into the medium to be transferred 102 side. Because of this, a magnetic layer 108 of the medium to be transferred 102 is magnetized (magnetizing directions are shown by arrows 109 in the diagram), and magnetic signals are transferred to the medium to be transferred 102 following the ferromagnetic material pattern 105 of the master disk 101. This kind of method is called an edge transfer method. One pair of magnets 103 disposed above and below the master disk 101 and medium to be transferred 102 rotate simultaneously, and the transfer is made to the whole of the medium to be transferred 102 at one time.

As another magnetic transfer method, there is also a method called a bit transfer. Referring to FIGS. 22A and 22B, a description will be given of a magnetic transfer method using the bit transfer method. Firstly, as shown in FIG. 22A, a first magnetic field 111 is applied in an approximately perpendicular direction to a surface of the medium to be transferred 102 using the one pair of magnets 103, magnetizing the medium to be transferred 102 in one direction. Next, as shown in FIG. 22B, the transfer master disk 101 and medium to be transferred 102 are brought into close contact, and a second magnetic field 113 of an orientation opposite to that of the first magnetic field 111 is applied using the one pair of magnets 103.

Only a small amount of a magnetic flux 115 passes through the depressed portions of the ferromagnetic pattern formed on the master disk 101, and the orientation of the magnetization with the first magnetic field 111 remains. As a large amount of the magnetic flux 115 can pass through the projecting portions of the ferromagnetic pattern, they are magnetized with the orientation of the second magnetic field 113. As a result of this, a magnetization pattern corresponding to the convex-concave pattern formed on the surface of the master disk 101 is transferred to the medium to be transferred 102.

With the heretofore described kinds of transfer magnetic field, after causing the magnets to rotate and transferring a predetermined pattern, it is necessary to cause the magnets to separate from the master disk and medium to be transferred. In the event of stopping the rotation of the magnets when causing them to separate, the magnetic field becomes uneven at a withdrawal position of the magnets, causing a signal deterioration. In order to prevent this kind of signal deterioration, a method has been proposed whereby the deterioration of the transfer signal at the withdrawal position is prevented by causing the magnets to separate from the master disk and medium to be transferred while maintaining their rotation (for example, refer to Japanese Patent No. 3,396,476).

Meanwhile, when considering a magnetic transfer to a magnetic recording medium with the high coercivity of recent years, there is a tendency for the magnetic field needed for the magnetic transfer to become larger. Also, with the kind of method disclosed in Japanese Patent No. 3,396,476, the magnets need a length that covers the inner periphery to the outer periphery of a region of the medium to which the transfer is to be made, an attractive force between the magnets disposed above and below the medium to be transferred in the case of the bit transfer, and a repulsive force between the magnets in the case of the edge transfer, increases, and it is necessary to increase the rigidity of a magnet holding portion in the transfer device. This leads to an increase in size of the transfer device. Furthermore, it is difficult to fabricate magnets of that kind of size evenly over the whole surface.

Also, with the kind of magnetic field application method disclosed in Japanese Patent No. 3,396,476, as a total of at least two rotations—one rotation for the application of the transfer magnetic field and one rotation for the separation of the magnets and medium to be transferred—are necessary, there is also room for improvement from the point of view of shortening the processing time.

SUMMARY OF THE INVENTION

The invention, having been contrived bearing in mind these kinds of problem, has an object of providing a magnetic transfer method and magnetic transfer device that, by reducing the area of one pair of magnetic field generating units (magnets) for applying a transfer magnetic field, can reduce an attractive force or repulsive force between the magnets, and furthermore, shorten a processing time.

In order to achieve this kind of object, according to one aspect of the invention, there is provided a magnetic transfer method applying a magnetic field to a contact body that brings into close contact a master disk having a ferromagnetic material pattern corresponding to preformatted signals and a magnetic recording medium, transferring the preformatted signals to the magnetic recording medium, wherein N (N is an integer of two or more) pairs of magnetic field generating units disposed at equal angles centered on the center of rotation of the contact body that apply a magnetic field to the contact body, having a length equal to or greater than (Ro−Ri)/N and less than (Ro−Ri) in the radial direction of the magnetic recording medium when the outer periphery radius of a transfer region on the magnetic recording medium is Ro and the inner periphery radius is Ri, are moved in radial synchrony in the directions of the outer periphery of the contact body, while the contact body is caused to rotate, at a speed at which they move a distance equal to or greater than (Ro−Ri) from the inner periphery side to the outer periphery side of the magnetic recording medium while the contact body rotates 360 degrees.

That is, by causing a plurality of pairs of magnetic field generating units to move in radial synchrony from the inner periphery side to the outer periphery side of a magnetic recording medium in a contact body, while causing the contact body to rotate, and apply a transfer magnetic field while describing a spiral trajectory as seen from above the magnetic recording medium, it is possible to shorten the time for the application of the transfer magnetic field and the withdrawal of the magnetic field generating units. Also, by disposing the plurality of pairs of magnetic field generating units, it is possible to reduce the area of one pair of magnetic field generating units disposed sandwiching the contact body.

Also, the magnetic field generating units may apply a magnetic field in a perpendicular direction to the contact body (a bit transfer), or may apply a magnetic field in a horizontal direction to the contact body (an edge transfer).

DETAILED DESCRIPTION OF THE EMBODIMENTS

Figure 1A:
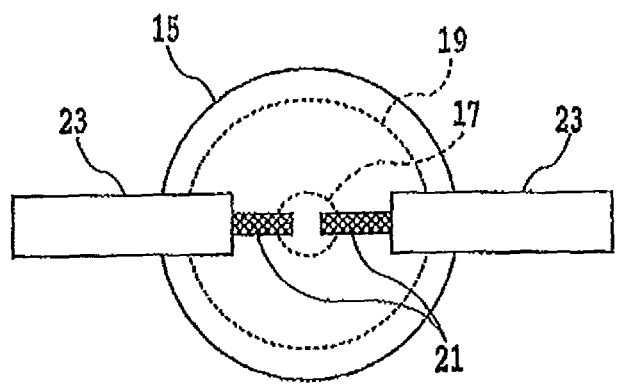
FIGS. 1A and 1B are diagrams schematically showing a transfer device according to one embodiment of the invention.

Hereafter, a detailed description will be given of the invention while referring to the drawings. The same reference numerals representing the same things in a plurality of drawings, a repeated description thereof will be omitted.

Embodiment

Figure 1B:
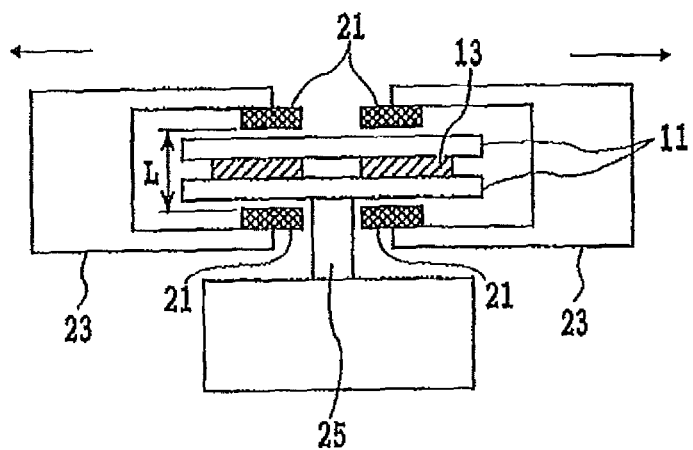

FIGS. 1A and 1B are diagrams schematically showing a transfer device 10 according to one embodiment of the invention. FIG. 1A shows a top schematic view of the transfer device 10, and FIG. 1B shows a sectional schematic view of the transfer device 10.

The transfer device 10 according to the embodiment has two pairs of magnetic field generating units 21 supported by support arms 23. A contact body 15 including a master disk 11 and a magnetic recording medium 13 is installed on a rotating drive unit 25, disposed in such a way as to be sandwiched up and down between each pair of the magnetic field generating units 21. The two pairs of magnetic field generating units 21 supported by the support arms 23 can move in directions parallel to the contact body 15 including the master disk 11 and magnetic recording medium 13 (the directions of arrows in the diagram) by means of an unshown drive mechanism. The radial length of the magnetic field generating units 21, when the radius of an outer periphery 19 of a transfer region is Ro(mm) and the radius of an inner periphery 17 is Ri(mm), is (Ro−Ri)/2(mm).

The movement of the magnetic field generating units 21 "parallel" to contact body 15 means that the distance of separation between the magnetic field generating units 21 and the contact surface of the contact body 15 is kept constant during the radial motion of the magnetic field generating units 21. This ensures the application of a substantially constant magnetic flux by the magnetic field generating units 21 to the contact body 15.

Figure 2:
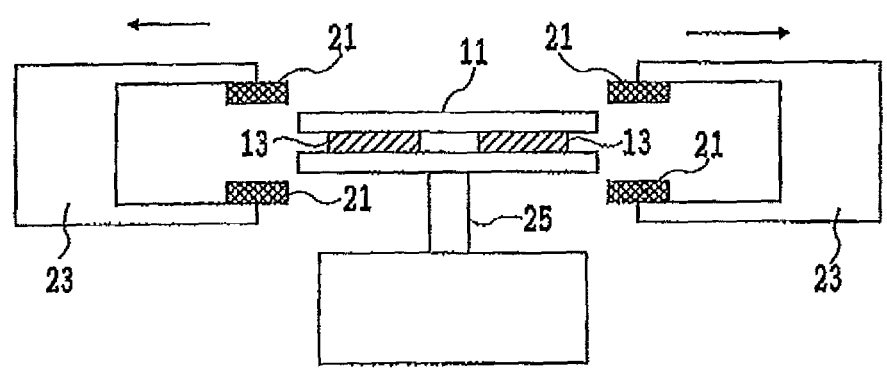
FIG. 2 is a diagram showing a condition in which a contact body including master disk and magnetic recording medium is clear of magnetic field generating units in the transfer device of FIGS. 1A and 1B.

From a condition in which ends of the outer periphery sides of the magnetic field generating units 21 are disposed so as to be positioned in the inner periphery 17 of the transfer region, the magnetic field generating units 21 are moved in radial synchrony in the directions of the outer periphery of the contact body 15 (the directions of the arrows in the diagram) while causing the contact body 15 to rotate at a rotation speed A(rpm), eventually attaining a condition in which the contact body 15 is completely clear of the magnetic field generating units 21, as shown in FIG. 2. By making the speed of the movement of the magnetic field generating units in the parallel directions A (Ro−Ri)/60(mm/s), this represents the speed at which a specific point on the magnetic field generating units 21 moves from Ri to Ro within one rotation. The term radial synchrony means that at any given moment during the radial motion, any one of the magnetic field generating units 21 will be at the same radial distance from the center of contact body 15 as any other of the magnetic field generating units 21.

In an embodiment, the magnetic field generating units move along a straight line disposed radially from the center of the contact body towards the periphery of the contact body. The contact body is rotating while the magnetic field generating are in motion. Therefore, in the course of radial motion, the movement of each magnetic field generating unit results in each such unit tracing a substantially spiral path along or in relation to the moving surface of the contact unit.

Also, a bit transfer method, whereby the magnetic field generating units 21 apply a magnetic field in a perpendicular direction on the contact body 15, may be employed as a magnetic transfer method, and an edge transfer method, whereby the magnetic field generating units 21 apply a magnetic field in a horizontal direction on the contact body 15, may also be employed.

Herein, a description will be given, referring to FIGS. 3 to 7, of a method whereby a transfer magnetic field is applied by the two pairs of magnetic field generating units 21. In FIGS. 3 to 7, the horizontal axis shows an angular position with respect to the magnetic recording medium, and the vertical axis shows a radial position with respect to the magnetic recording medium.

Figure 3:
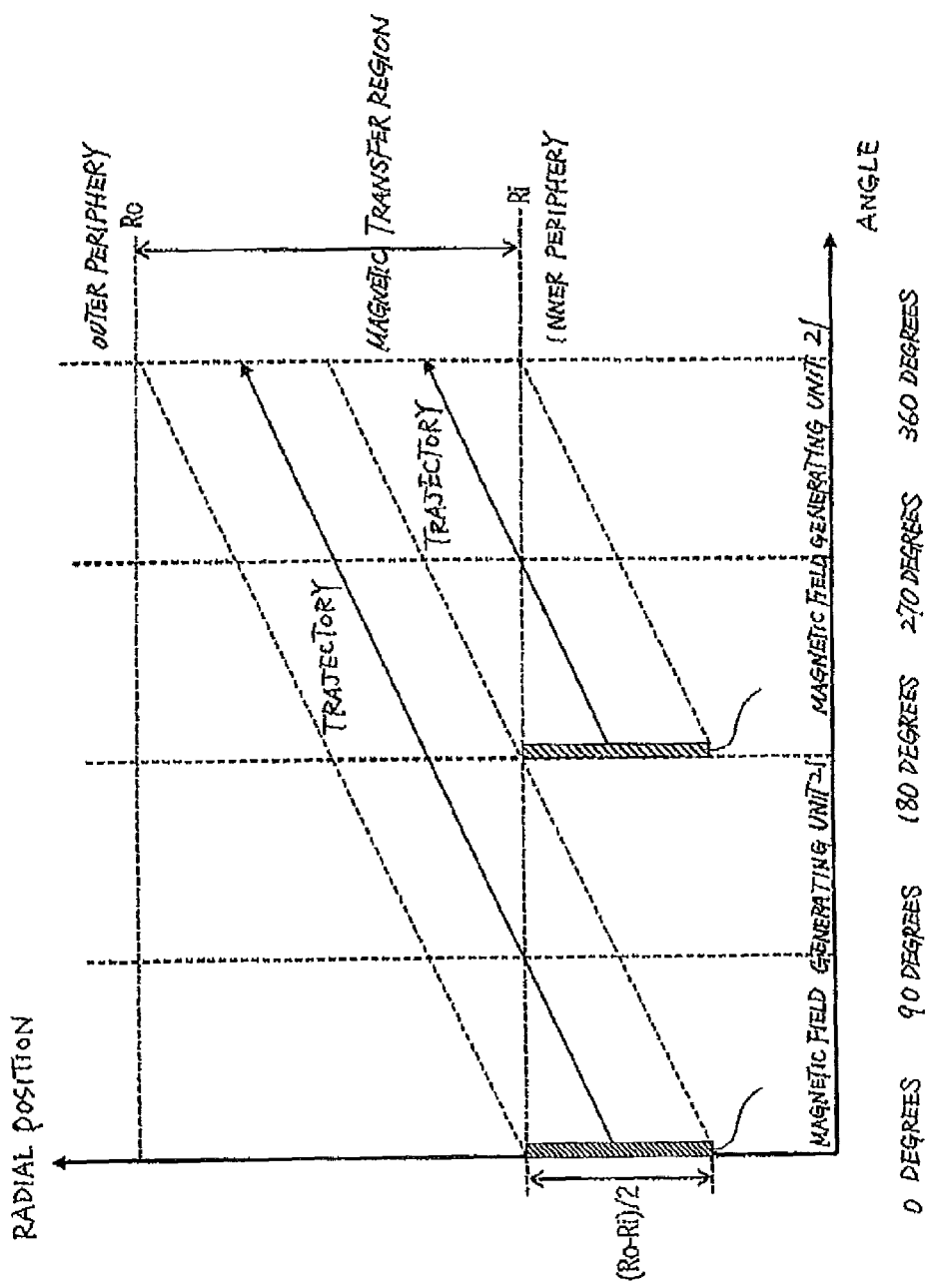
FIG. 3 is a diagram showing how a transfer magnetic field is applied in the transfer device according to the embodiment of the invention.

FIG. 3 shows a condition immediately before carrying out a transfer process after installing the contact body 15 including the master disk 11 and magnetic recording medium 13 in the transfer device 10, and represents a condition in which the two pairs of magnetic field generating units 21 are positioned in the innermost periphery of the transfer region, in positions at 0 degrees and 180 degrees. Subsequently, the magnetic field generating units 21 are moved in the directions of the outer periphery of the contact body 15 while the contact body 15 is rotated using the rotating drive unit 25. The individual trajectories of the two pairs of magnetic field generating units 21 on the rotated contact body 15 are as shown by arrows in the diagram. In the diagram, a range defined by angular positions 0 to 360 degrees, and the inner periphery radius Ri to the outer periphery radius Ro, is the region to which the transfer magnetic field is applied.

Figure 4:
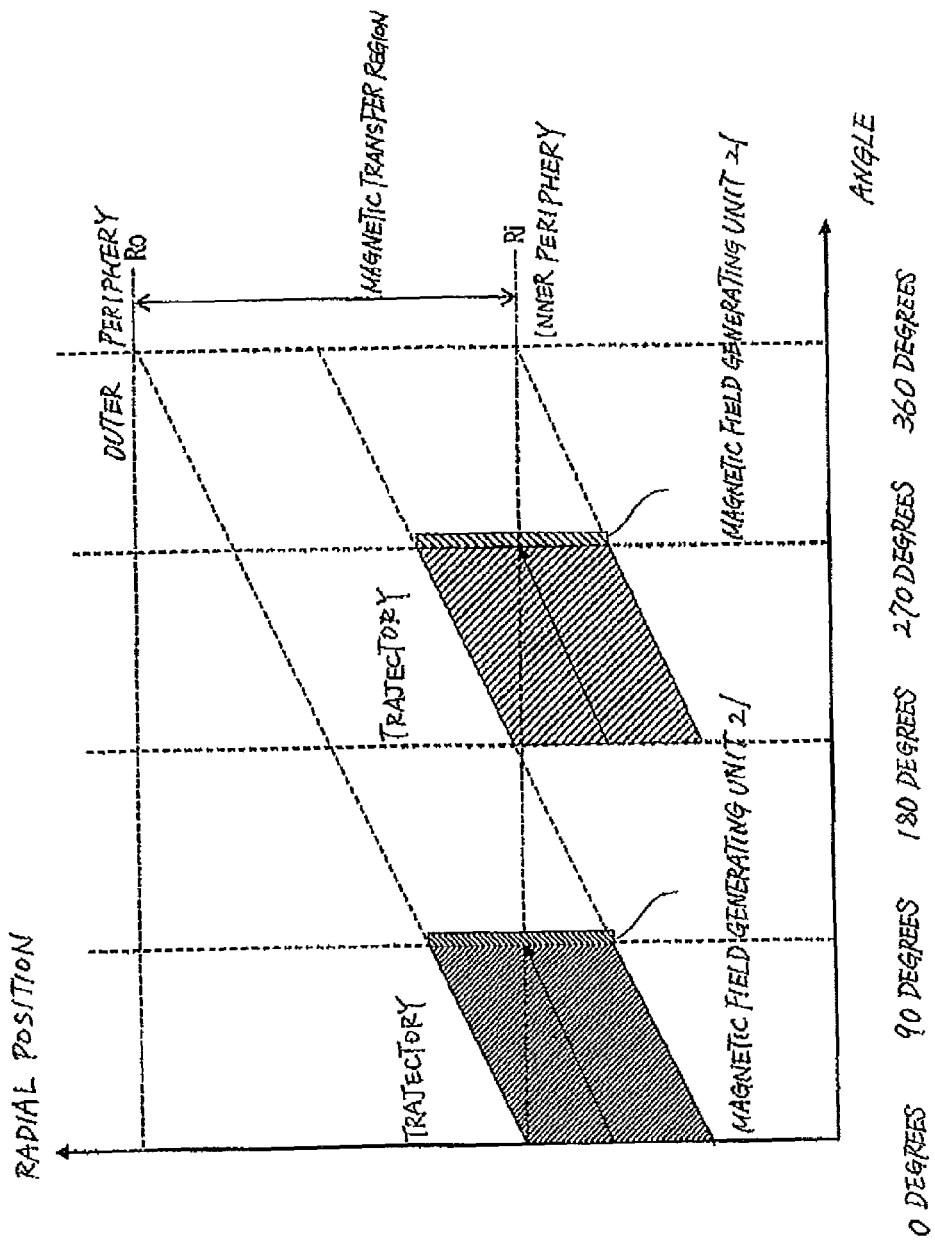
FIG. 4 is a diagram showing how the transfer magnetic field is applied in the transfer device according to the embodiment of the invention.
Figure 5:
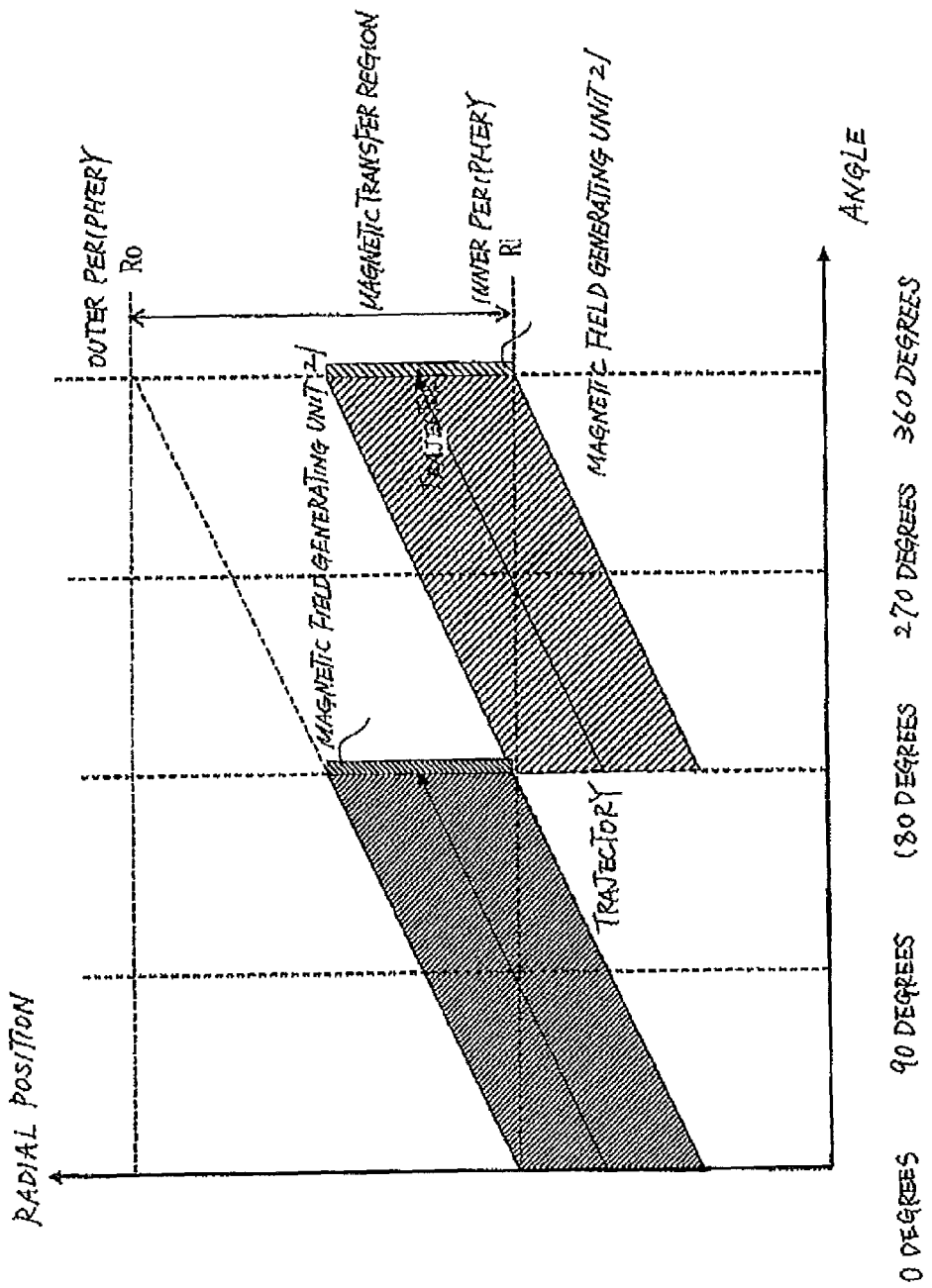
FIG. 5 is a diagram showing how the transfer magnetic field is applied in the transfer device according to the embodiment of the invention.
Figure 6:
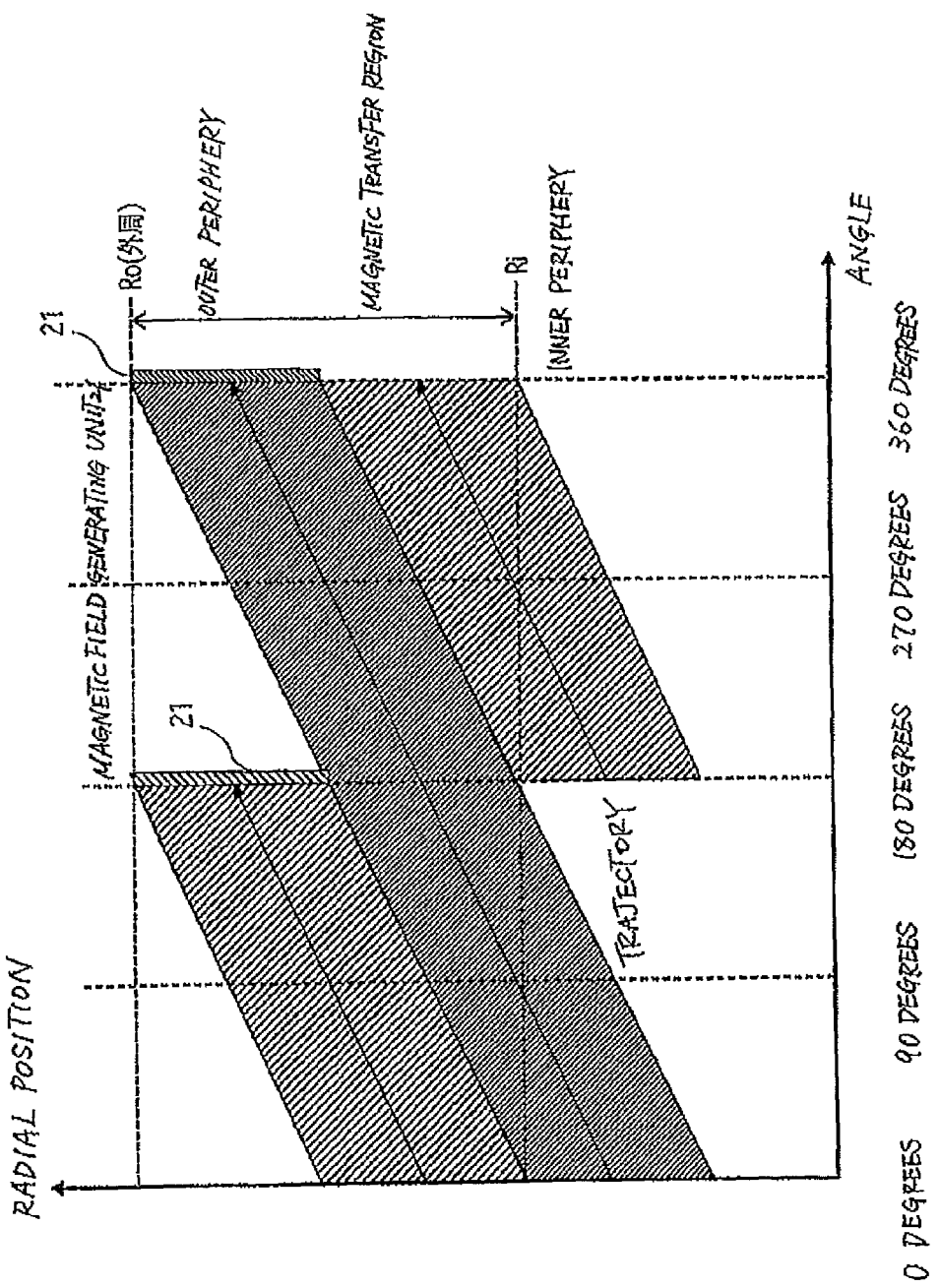
FIG. 6 is a diagram showing how the transfer magnetic field is applied in the transfer device according to the embodiment of the invention.
Figure 7:
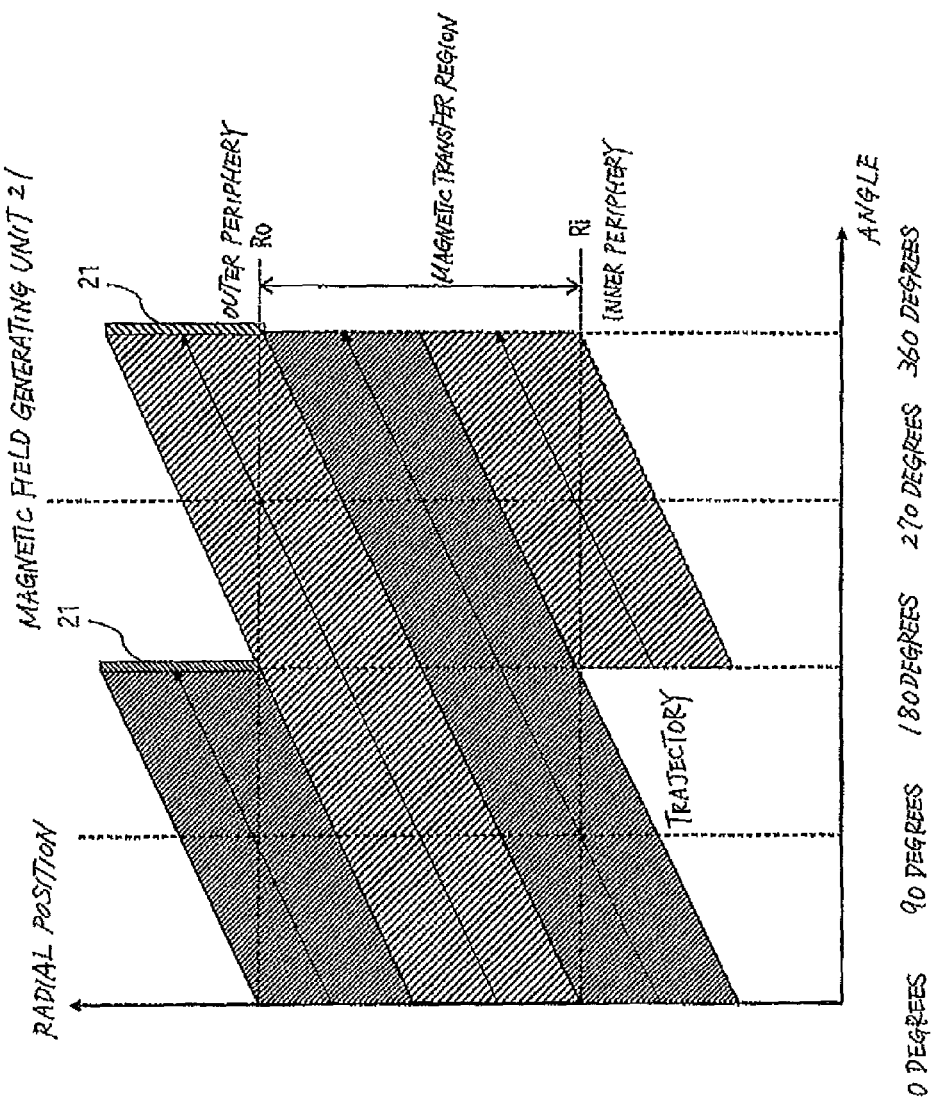
FIG. 7 is a diagram showing how the transfer magnetic field is applied in the transfer device according to the embodiment of the invention.

FIG. 4 shows a condition when the contact body 15 (the magnetic recording medium 13) has rotated 90 degrees. The shaded portions in the drawing are regions to which the transfer magnetic field has been applied by each of the magnetic field generating units 21. FIG. 5 shows a condition when the contact body 15 (the magnetic recording medium 13) has rotated 180 degrees, and FIG. 6 shows a condition when the contact body 15 (the magnetic recording medium 13) has rotated 360 degrees. Finally, in the condition shown in FIG. 7, it is possible to apply the magnetic field to the whole of the transfer region, and the rotation angle of the contact body 15 (the magnetic recording medium 13) needed thus far is 540 degrees.

In the embodiment, by making the radial length of the magnetic field generating units 21 (Ro−Ri)/2 and causing the contact body 15 (the magnetic recording medium 13) to rotate in this way, it is possible to carry out the application of the transfer magnetic field to the magnetic recording medium 13, and the separation of the magnetic field generating units 21 from the magnetic recording medium 13, in one and a half rotations, and it is possible to shorten the processing time.

Although a description is given in the embodiment of the transfer device 10 including the two pairs of magnetic field generating units 21 disposed at 180 degrees centered on the center of rotation of the contact body, the magnetic transfer device according to the invention can include N (N is an integer of two or more) pairs of magnetic field generating units. Also, when including N pairs of magnetic field generating units, it is sufficient that the radial length of the magnetic field generating units is equal to or greater than (Ro−Ri)/N (N is an integer of two or more), and less than (Ro−Ri), and it is possible to make the speed at which the magnetic field generating units move parallel in the directions of the outer periphery of the contact body a speed whereby the magnetic field generating units move a distance equal to or greater than (Ro−Ri) from the inner periphery side to the outer periphery side of the contact body (magnetic recording medium) while the contact body rotates 360 degrees.

EXAMPLE 1

A transfer device according to Example 1 includes two pairs of the magnetic field generating units 21, in the same way as the transfer device 10 shown in FIGS. 1A and 1B, and the radial length of the magnetic field generating units 21 is 2(Ro−Ri)/3. In particular, in the example, the outer periphery radius Ro of the transfer region is 30 mm, the inner periphery radius Ri is 15 mm, and the radial length of the magnetic field generating units 21 is 2(30−15)/3=10 mm. This length is less than that in a comparison example to be described hereafter. Also, a distance L between the magnetic field generating units 21 disposed above and below so as to sandwich the contact body 15 is 3.5 mm, and the width of the magnetic field generating units 21 is 6 mm.

As heretofore described, the contact body 15 is installed in the transfer device 10 and, from a condition in which ends of the outer periphery sides of the magnetic field generating units 21 are disposed so as to be positioned in the inner periphery 17 of the transfer region, the magnetic field generating units 21 are moved in parallel directions to the outer periphery side of the contact body 15 (the directions of the arrows in the diagram) while causing the contact body 15 to rotate at a rotation speed of 15 rpm, eventually attaining the condition in which the contact body 15 is completely clear of the magnetic field generating units 21, as shown in FIG. 2. The movement speed of the magnetic field generating units 21, as a speed at which the magnetic field generating units 21 can move from Ri to Ro during a rotation of 270 degrees, is 15/(4×¾)=5 mm/s.

Figure 8:
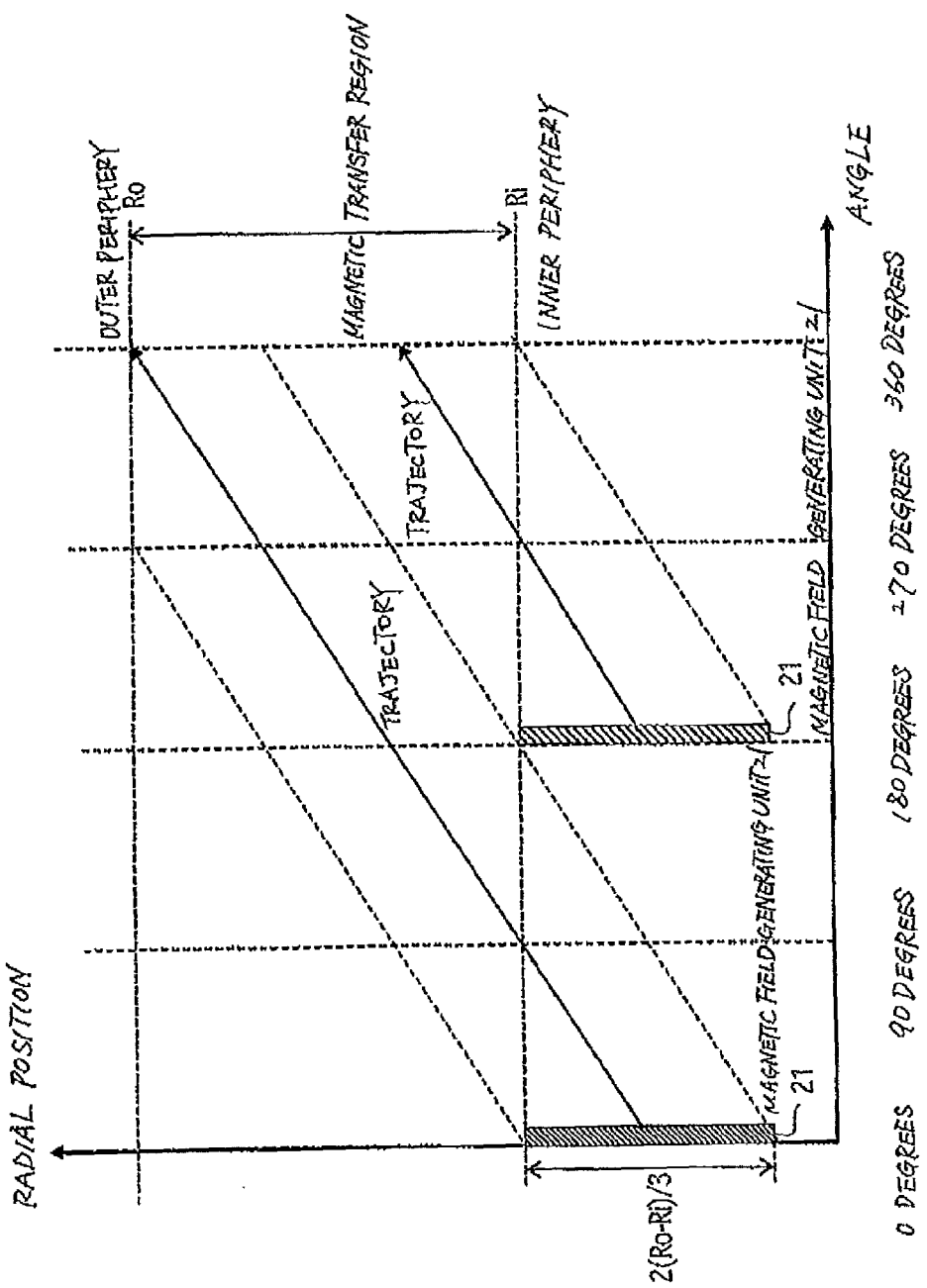
FIG. 8 is a diagram showing how a transfer magnetic field is applied in a transfer device according to Example 1 of the invention.

Herein, a description will be given, referring to FIGS. 8 to 11, of a method whereby a transfer magnetic field is applied by the two pairs of magnetic field generating units 21 in the example. In FIGS. 8 to 11, the horizontal axis shows an angular position with respect to the magnetic recording medium to be transferred to, and the vertical axis shows a radial position with respect to the magnetic recording medium. FIG. 8 shows a condition immediately before a transfer is carried out, and represents a condition in which the two pairs of magnetic field generating units 21 are positioned in the innermost periphery, in positions at 0 degrees and 180 degrees. Subsequently, the magnetic field generating units 21 are moved in the directions of the outer periphery while the contact body 15 is rotated using the rotating drive unit 25. The individual trajectories of the magnetic field generating units 21 on the rotated contact body 15 are as shown by arrows in the diagram. In the diagram, a range defined by angular positions 0 to 360 degrees, and the inner periphery radius Ri to the outer periphery radius Ro, is the region to which the transfer magnetic field is applied.

Figure 9:
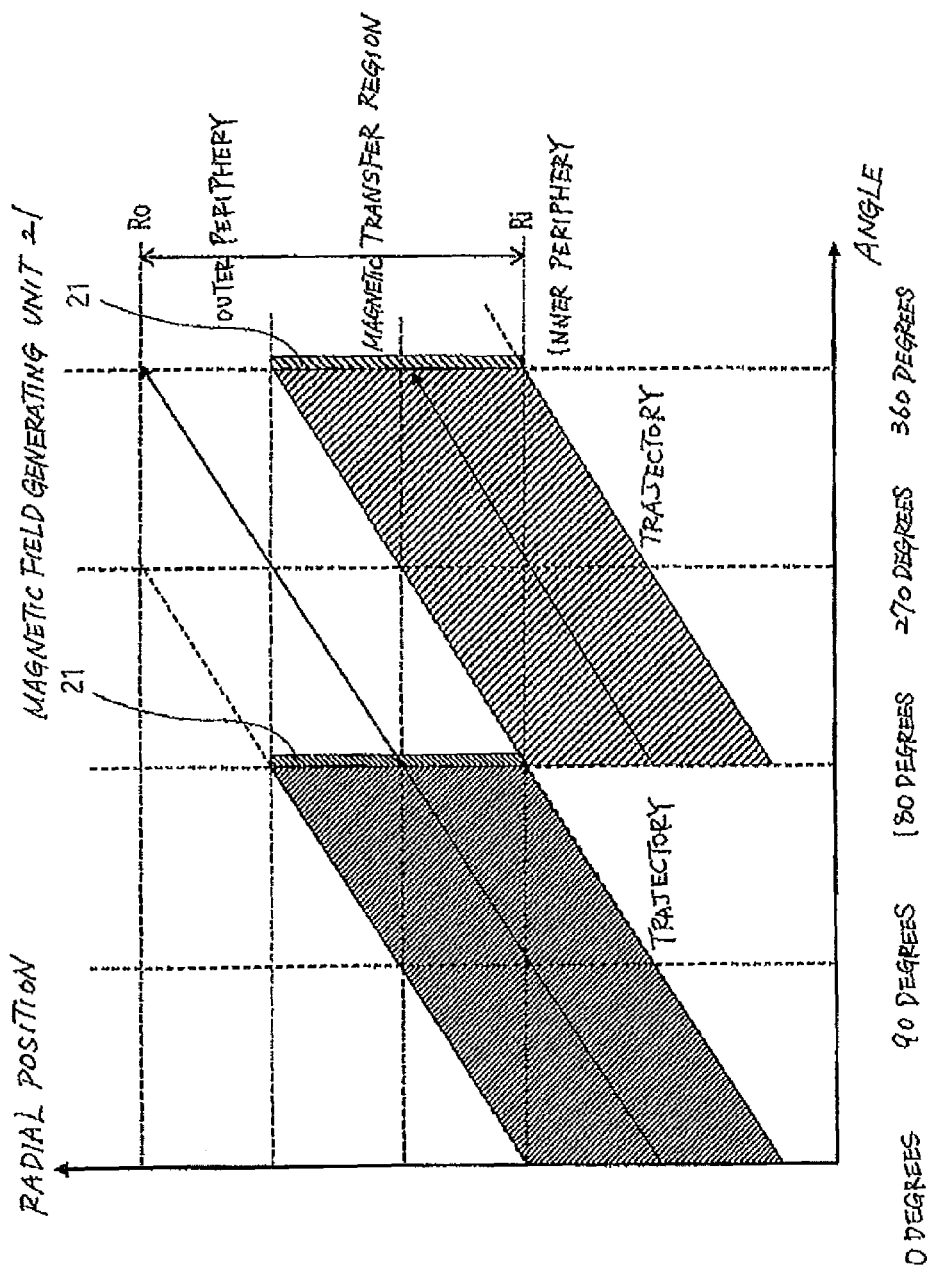
FIG. 9 is a diagram showing how the transfer magnetic field is applied in the transfer device according to Example 1 of the invention.
Figure 10:
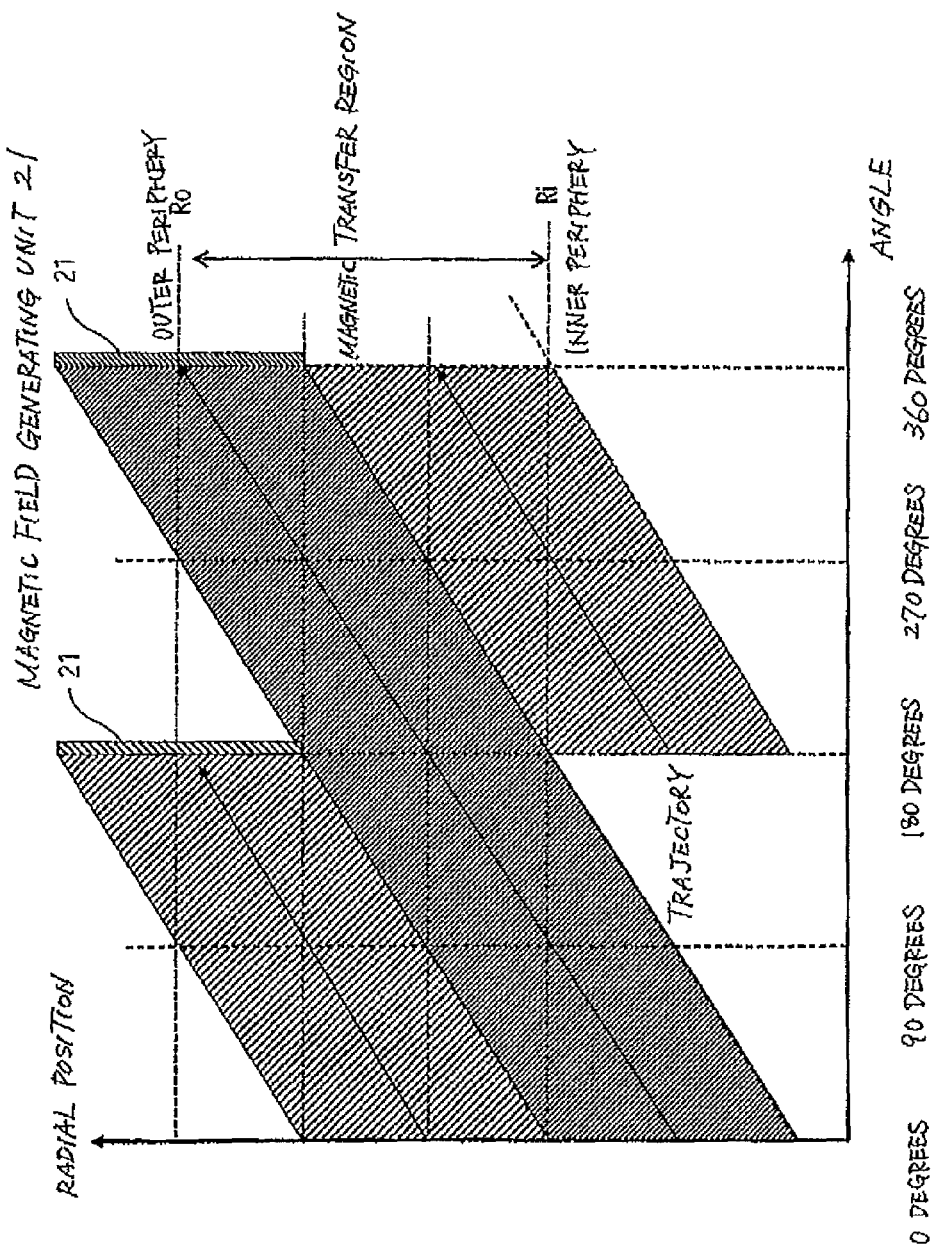
FIG. 10 is a diagram showing how the transfer magnetic field is applied in the transfer device according to Example 1 of the invention.
Figure 11:
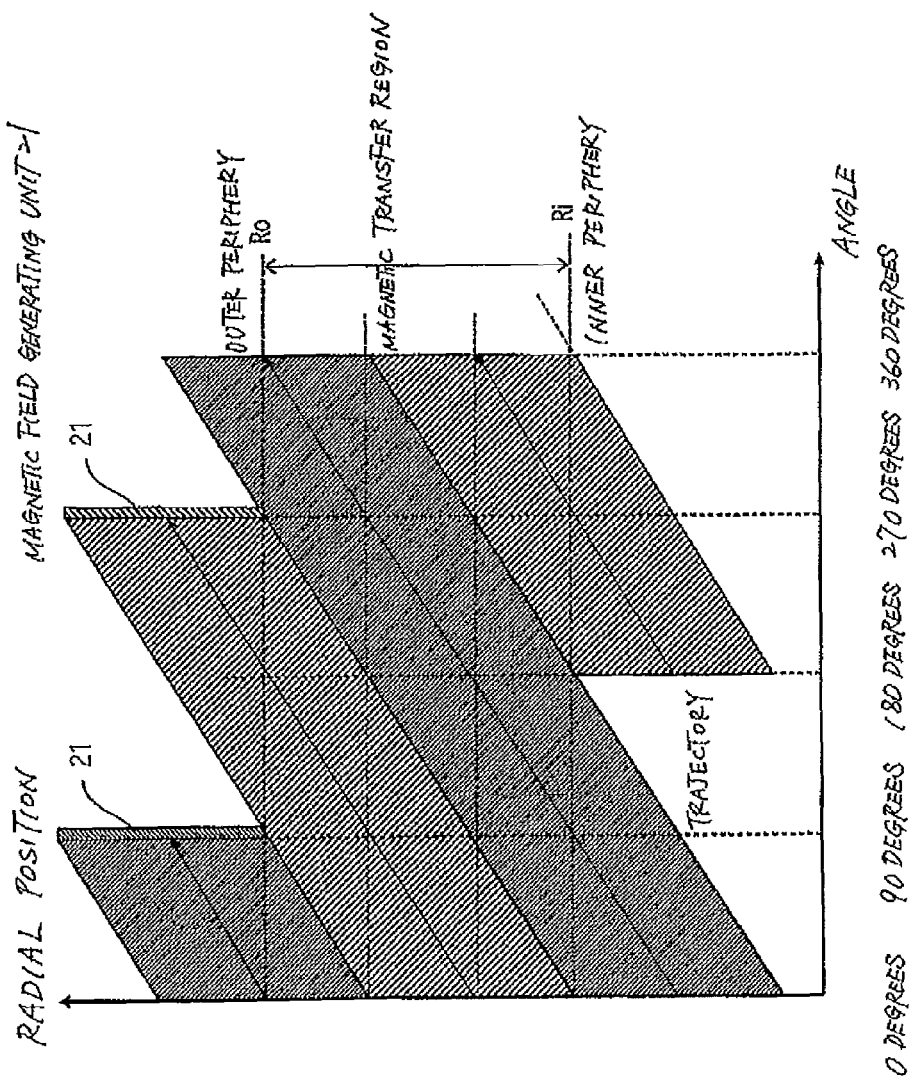
FIG. 11 is a diagram showing how the transfer magnetic field is applied in the transfer device according to Example 1 of the invention.

FIG. 9 shows a condition when the contact body 15 (the magnetic recording medium 13) has rotated 180 degrees. FIG. 10 shows a condition when the contact body 15 has rotated 360 degrees. Finally, in the condition shown in FIG. 11, it is possible to apply the magnetic field to the whole of the transfer region, and the rotation angle of the contact body 15 (the magnetic recording medium 13) needed thus far is 450 degrees. As a result, the time taken for the application of the transfer magnetic field to the contact body 15 (magnetic recording medium 13) and the withdrawal of the magnetic field generating units 21 from the contact body 15 (magnetic recording medium 13) is five seconds, and it is possible to make the processing time shorter than in the comparison example, to be described hereafter.

EXAMPLE 2

Figure 12:
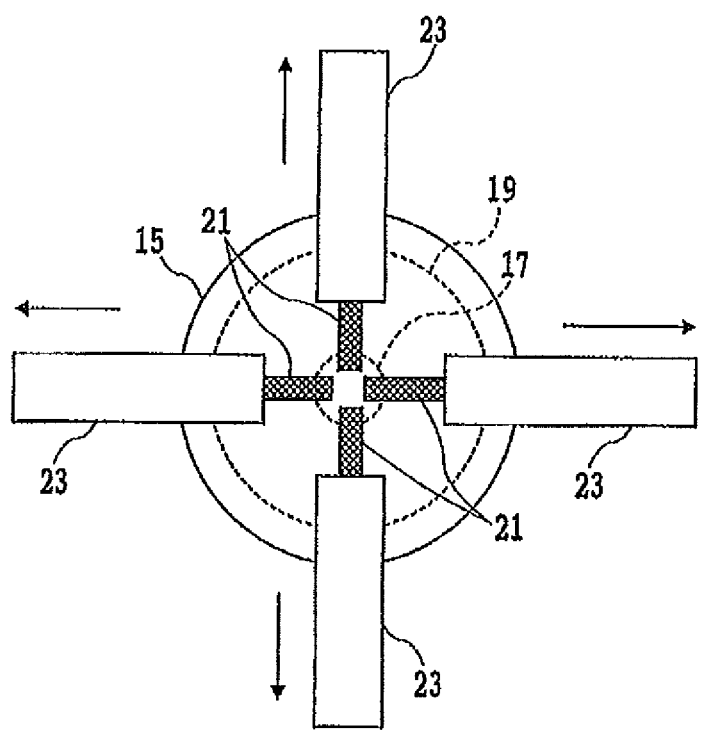
FIG. 12 is a diagram schematically showing a transfer device according to Example 2 of the invention.

FIG. 12 shows a top schematic view of a transfer device 20 according to Example 2. The transfer device 20 includes four pairs of magnetic field generating units 21, each of which can be moved parallel to the contact body 15, in the same way as in the embodiment. Also, the radial length of the magnetic field generating units 21 is (Ro−Ri)/4. In particular, in the example, the outer periphery radius Ro is 30 mm, the inner periphery radius Ri is 15 mm, and the radial length of the magnetic field generating units 21 is (30−15)/4=3.75 mm. This length is less than that in the comparison example to be described hereafter. Also, the distance L between the magnetic field generating units is 3.5 mm, and the width of the magnetic field generating units 21 is 6 mm, the same as in Example 1.

As heretofore described, the contact body 15 is installed in the transfer device 20 and, from a condition in which ends of the outer periphery sides of the four pairs of magnetic field generating units 21 are disposed so as to be positioned in the inner periphery 17 of the transfer region, the magnetic field generating units 21 are moved to the outer periphery side of the contact body 15 while causing the contact body 15 to rotate at a rotation speed of 15 rpm, eventually attaining the condition in which the contact body 15 is completely clear of the magnetic field generating units 21. The movement speed of the magnetic field generating units 21, as a speed at which the magnetic field generating units can move from Ri to Ro during a rotation of 360 degrees, is 15(30−15)/60=3.75 mm/s.

Figure 13:
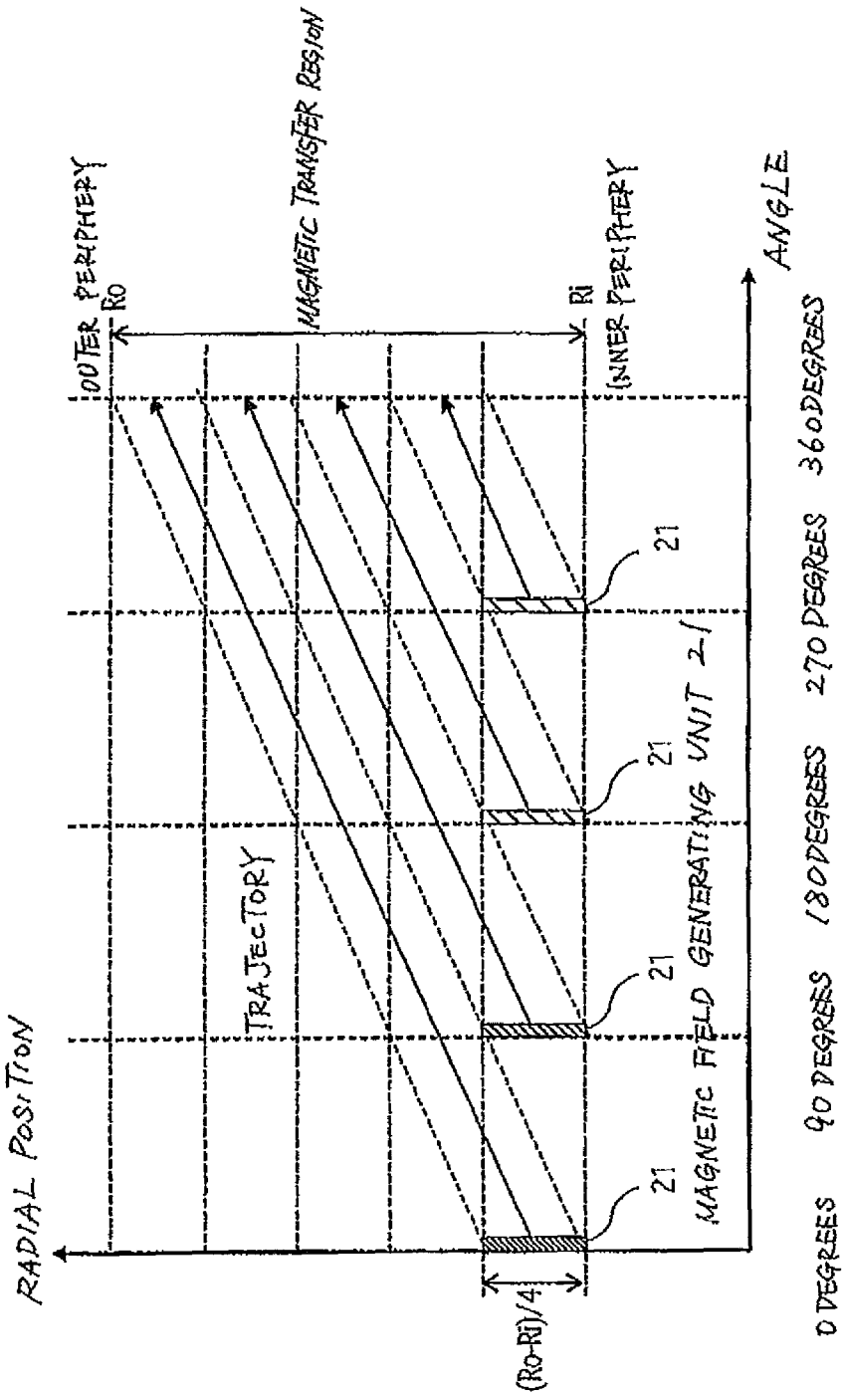
FIG. 13 is a diagram showing how a transfer magnetic field is applied in the transfer device according to Example 2 of the invention.

Herein, a description will be given, referring to FIGS. 13 to 15, of a method whereby a transfer magnetic field is applied by the four pairs of magnetic field generating units 21 in the example. FIG. 13 shows a condition immediately before a transfer is carried out, and represents a condition in which the four pairs of magnetic field generating units 21 are positioned in the innermost periphery, in positions at 0 degrees, 90 degrees, 180 degrees, and 270 degrees. Subsequently, the magnetic field generating units 21 are moved in the directions of the outer periphery while the contact body 15 is caused to rotate. The individual trajectories of the magnetic field generating units 21 on the rotated contact body 15 are as shown by arrows in the diagram. In the diagram, a range defined by angular positions 0 to 360 degrees, and the inner periphery radius Ri to the outer periphery radius Ro, is the region to which the transfer magnetic field is applied.

Figure 14:
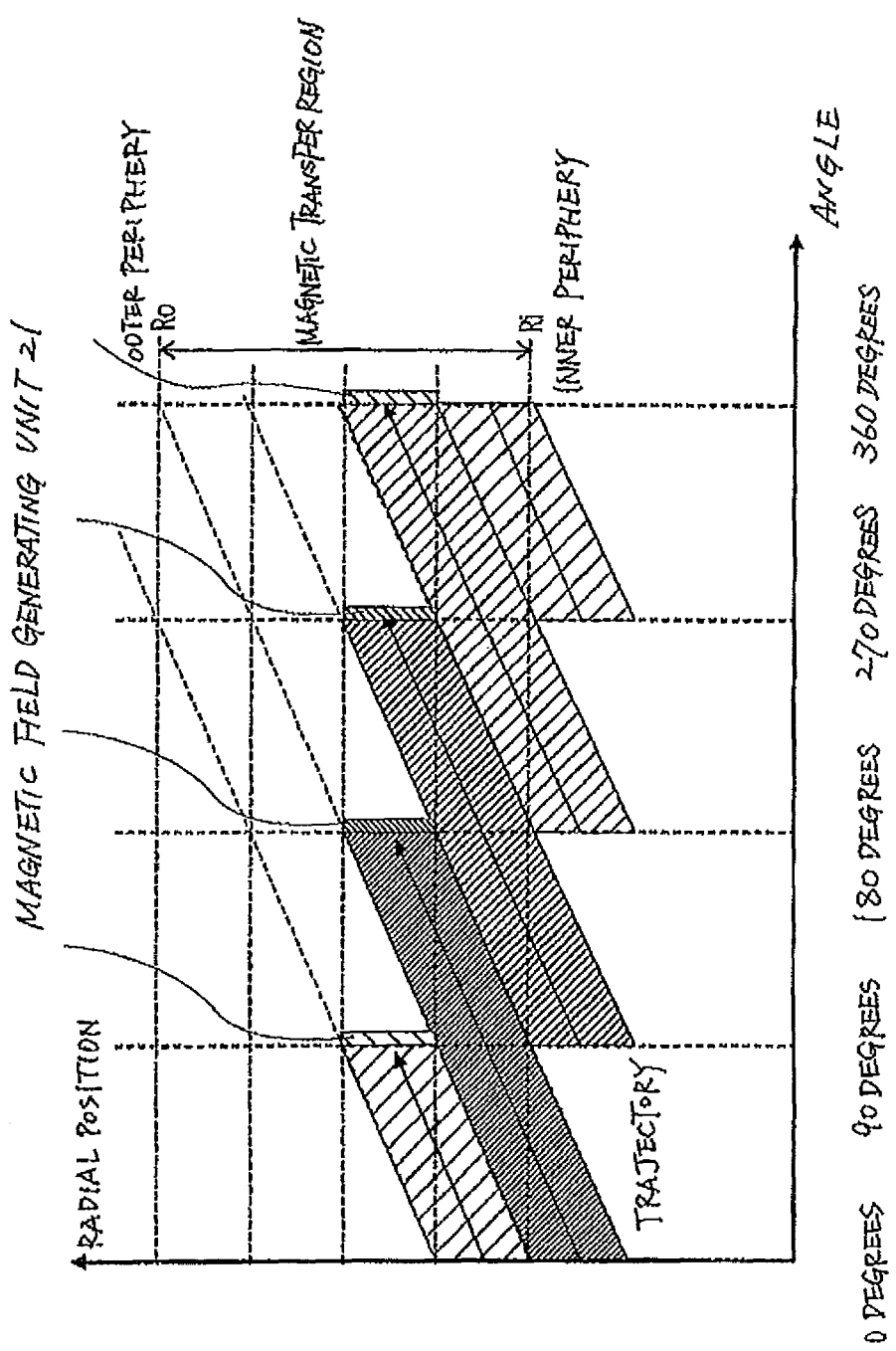
FIG. 14 is a diagram showing how the transfer magnetic field is applied in the transfer device according to Example 2 of the invention.
Figure 15:
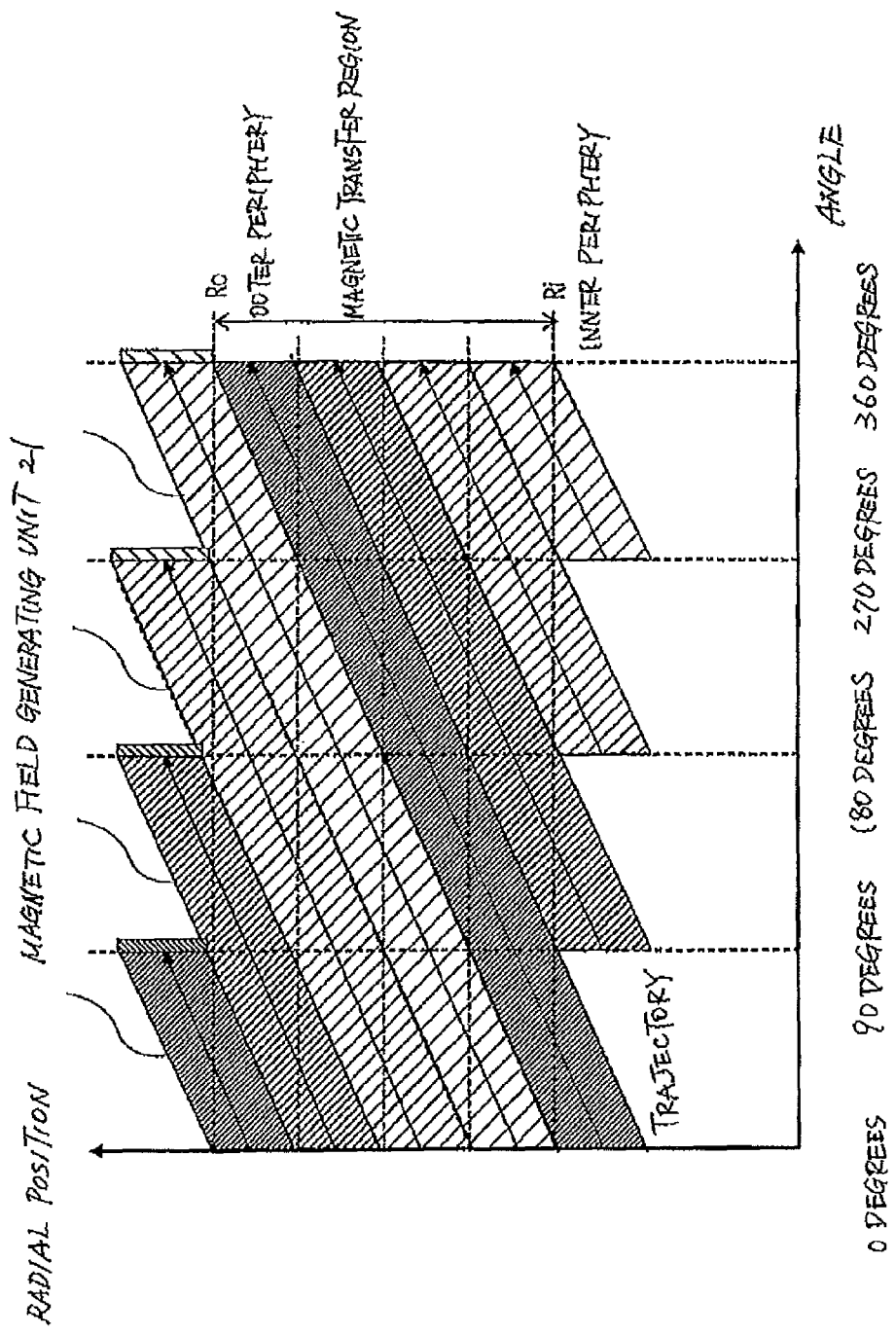
FIG. 15 is a diagram showing how the transfer magnetic field is applied in the transfer device according to Example 2 of the invention.

FIG. 14 shows a condition when the contact body 15 (the magnetic recording medium 13) has rotated 180 degrees, and finally, in the condition shown in FIG. 15, it is possible to apply the magnetic field to the whole of the transfer region, and the rotation angle of the contact body 15 (the magnetic recording medium 13) needed thus far is 450 degrees. As a result, the time taken for the application of the transfer magnetic field to the contact body 15 (magnetic recording medium 13) and the withdrawal of the magnetic field generating units 21 from the contact body 15 (magnetic recording medium 13) is five seconds, and it is possible to make the processing time shorter than in the comparison example, to be described hereafter.

EXAMPLE 3

A transfer device according to Example 3 includes four pairs of magnetic field generating units 21, in the same way as the transfer device 20 according to Example 2 shown in FIG. 12, and the radial length of the magnetic field generating units 21 is (Ro−Ri)/2. In particular, in the example, the outer periphery radius Ro of the transfer region is 30 mm, the inner periphery radius Ri is 15 mm, and the radial length of the magnetic field generating units 21 is (30−15)/2=7.5 mm. This length is less than that in the comparison example to be described hereafter. Also, the distance L between the magnetic field generating units is 3.5 mm, and the width of the magnetic field generating units 21 is 6 mm, the same as in the heretofore described examples.

As heretofore described, from a condition in which the contact body 15 is disposed in the transfer device 20, the magnetic field generating units 21 are moved to the outer periphery side while causing the contact body 15 to rotate at a rotation speed of 15 rpm, eventually attaining the condition in which the contact body 15 is completely clear of the magnetic field generating units 21. The movement speed of the magnetic field generating units 21, as a speed at which the magnetic field generating units 21 can move from Ri to Ro during a rotation of 180 degrees, is 15/2=7.5 mm/s.

Figure 16:
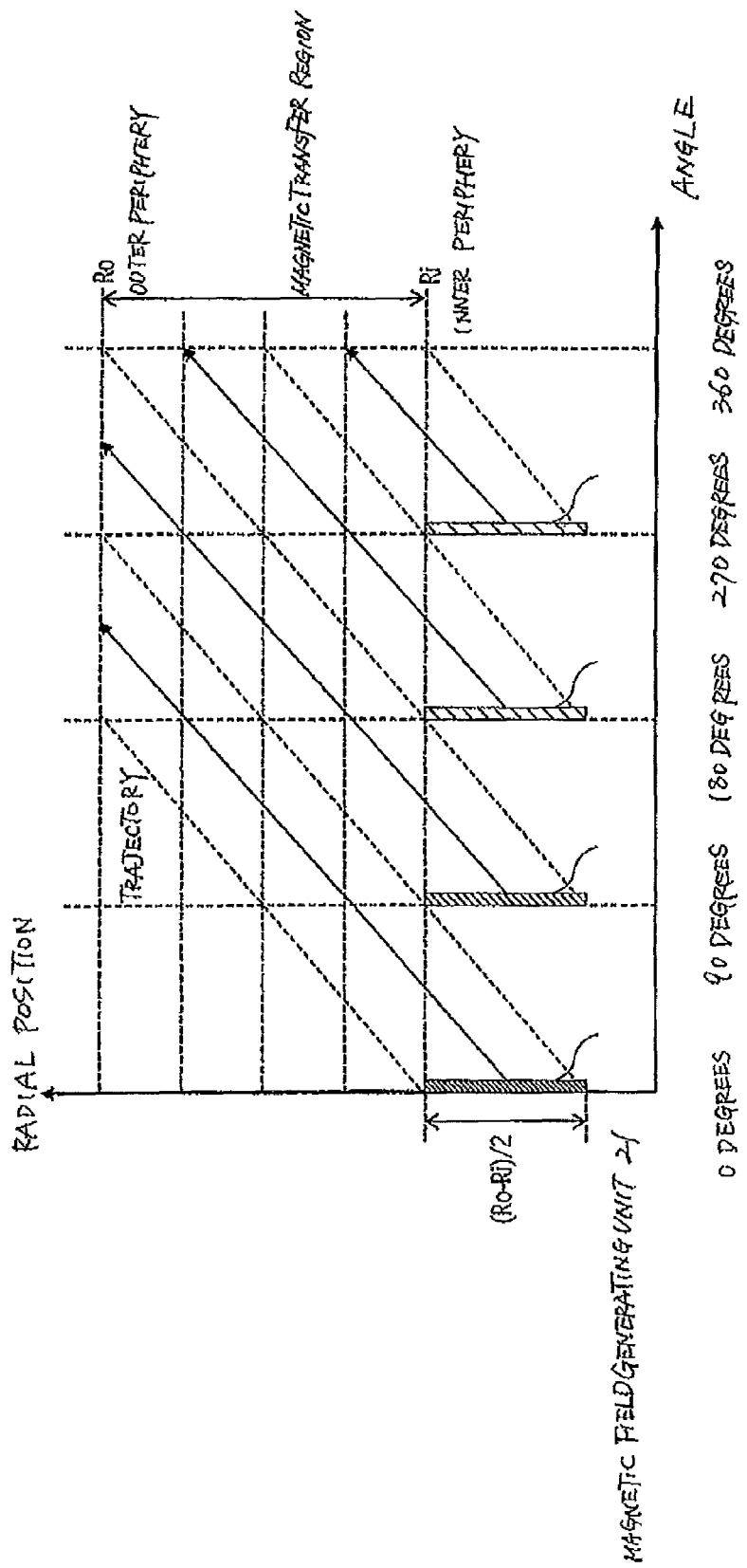
FIG. 16 is a diagram showing how a transfer magnetic field is applied in a transfer device according to Example 3 of the invention.

Herein, a description will be given, referring to FIGS. 16 to 18, of a method whereby a transfer magnetic field is applied by the four pairs of magnetic field generating units 21 in the example. FIG. 16 shows a condition immediately before a transfer is carried out, and represents a condition in which the four pairs of magnetic field generating units 21 are positioned in the innermost periphery, in positions at 0 degrees, 90 degrees, 180 degrees, and 270 degrees. Subsequently, the magnetic field generating units 21 are moved in the directions of the outer periphery while the contact body 15 is caused to rotate. The individual trajectories of the magnetic field generating units 21 are as shown by arrows in the diagram. In the diagram, a range defined by angular positions 0 to 360 degrees, and the inner periphery radius Ri to the outer periphery radius Ro, is the region to which the transfer magnetic field is applied.

Figure 17:
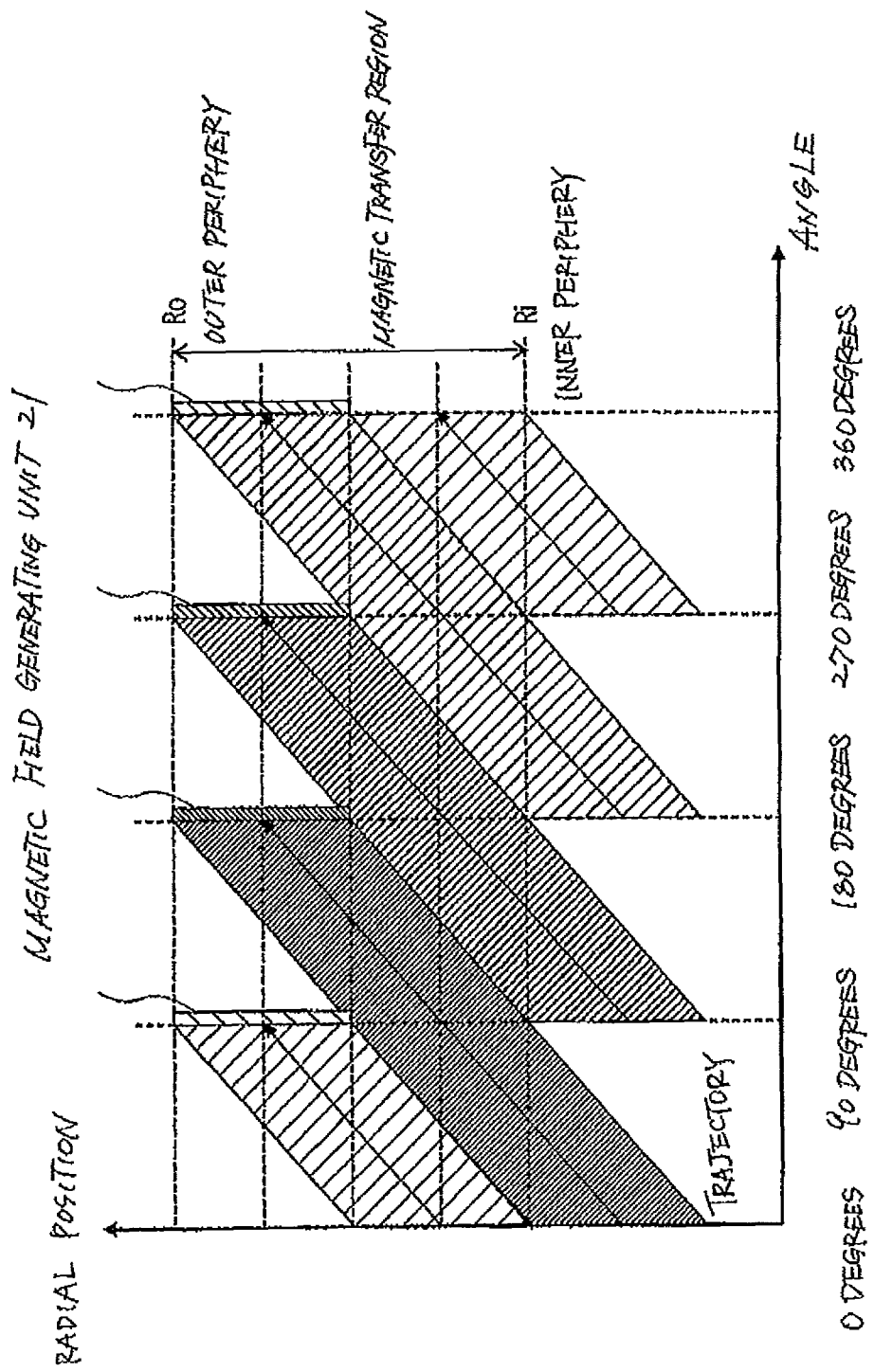
FIG. 17 is a diagram showing how the transfer magnetic field is applied in the transfer device according to Example 3 of the invention.
Figure 18:
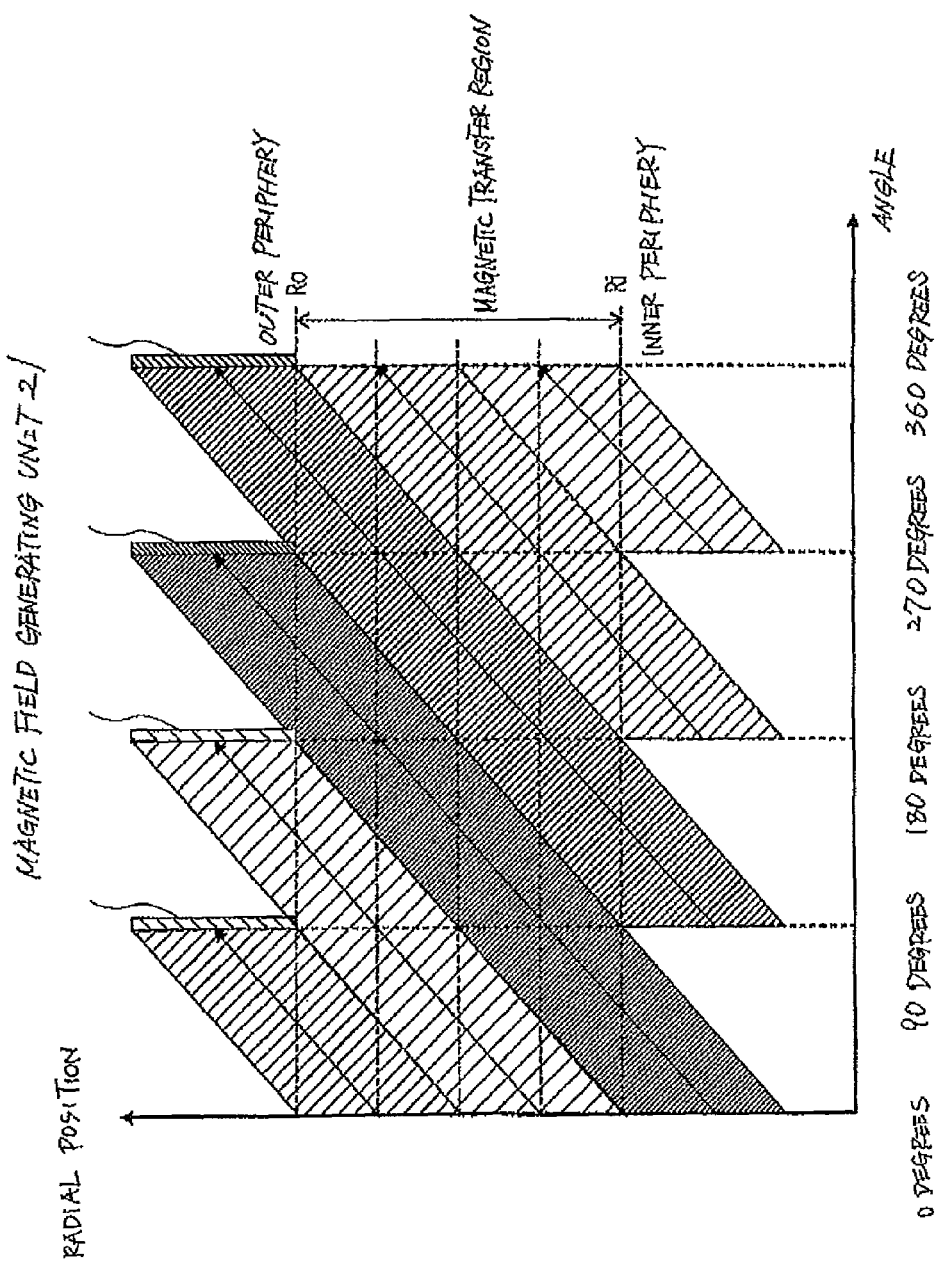
FIG. 18 is a diagram showing how the transfer magnetic field is applied in the transfer device according to Example 3 of the invention.

FIG. 17 shows a condition when the contact body 15 (the magnetic recording medium 13) has rotated 180 degrees, and finally, in the condition shown in FIG. 18, it is possible to apply the magnetic field to the whole of the transfer region, and the rotation angle of the contact body 15 (the magnetic recording medium 13) needed thus far is 270 degrees. As a result, the time taken for the application of the transfer magnetic field to the contact body 15 (magnetic recording medium 13) and the withdrawal of the magnetic field generating units 21 from the contact body 15 (magnetic recording medium 13) is three seconds, and it is possible to make the processing time shorter than in the comparison example, to be described hereafter.

COMPARISON EXAMPLE

Figure 19A:
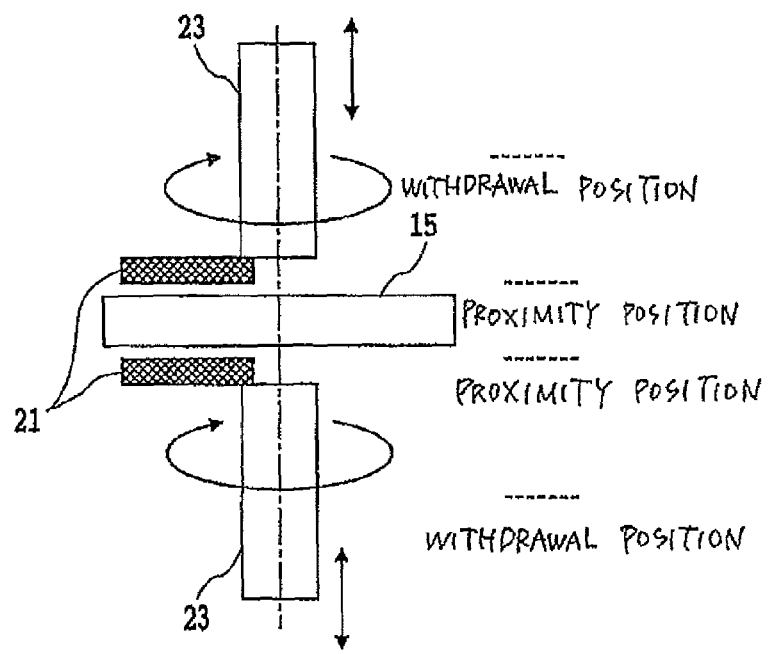
FIGS. 19A and 19B are diagrams schematically showing a transfer device according to a comparison example.
Figure 19B:
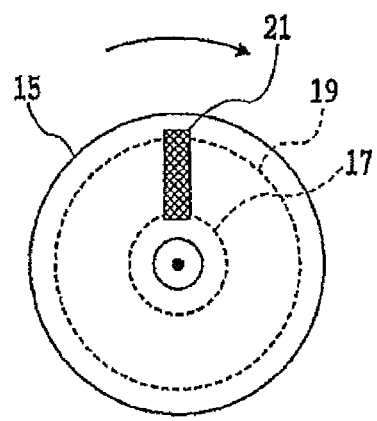

FIGS. 19A and 19B show a transfer device 30 as a comparison example. FIG. 19A is a top schematic view of the transfer device 30, and FIG. 19B is a sectional schematic view of the transfer device 30. The transfer device 30 includes one pair of magnetic field generating units 21 supported by support arms 23. Also, the magnetic field generating units 21 can be moved in a direction perpendicular to a contact body 15 including a master disk and a magnetic recording medium by means of an unshown drive mechanism. Also, the center of rotation of the magnetic field generating units 21 is the same as the center of the contact body 15. The radial length of the magnetic field generating units 21 is (Ro−Ri), and in particular, in the comparison example, an outer periphery radius Ro is 30 mm, an inner periphery radius Ri is 15 mm, and the radial length of the magnetic field generating units 21 is 15 mm. Also, a distance L between the magnetic field generating units 21 disposed above and below is 3.5 mm, and the width of the magnetic field generating units 21 is 6 mm. Also, the distance between the contact body 15 and the proximity position of the magnetic field generating units 21 is 0.5 mm, and the distance between the proximity position and the withdrawal position of the magnetic field generating units 21 is 30 mm.

Next, a description will be given of a method of magnetic transfer to a magnetic recording medium using the transfer device 30.

Firstly, the magnetic field generating units 21 are moved to the proximity position. Next, the magnetic field generating units 21 are rotated 360 degrees in a direction parallel to the contact body 15. Herein, the rotation speed of the magnetic field generating units 21 is 15 rpm. Subsequently, the magnetic field generating units 21 are moved in a perpendicular direction to the withdrawal position, while maintaining the rotation. The speed of movement in the perpendicular direction when withdrawing is 5 mm/s. When the magnetic field generating units 21 have been rotated a further 360 degrees after starting the withdrawal operation, the movement in the perpendicular direction, and the rotation, of the magnetic field generating units 21 are stopped, and the magnetic field application and withdrawal are completed.

The processing time of the magnetic transfer step in the comparison example, the transfer time being four seconds and the withdrawal time four seconds, is eight seconds in all. That is, the result is that the processing time of the magnetic transfer step in the comparison example is longer than that in the examples.

Figure 20:
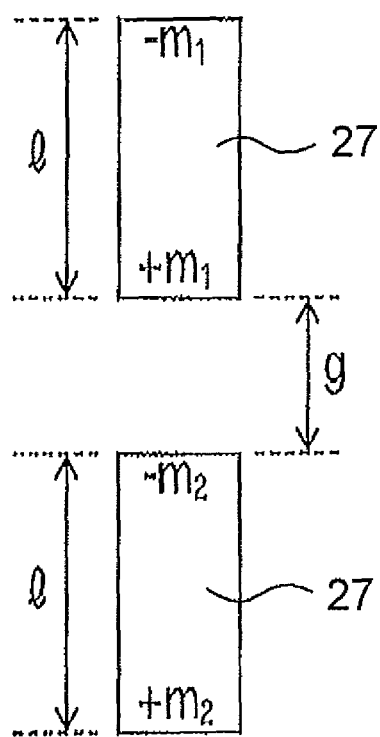
FIG. 20 is a diagram illustrating a force working between one pair of bar magnets.
Figure 21:
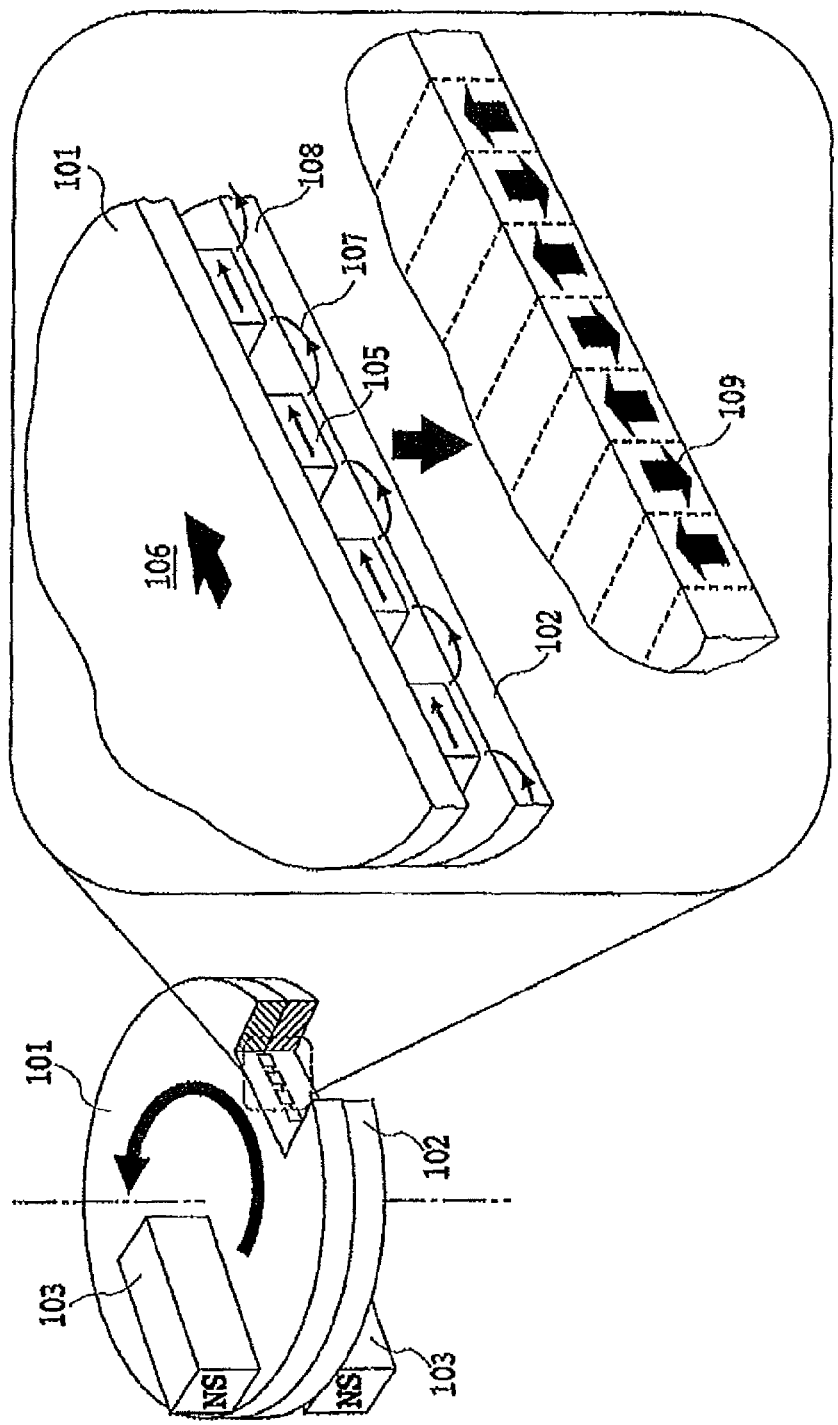
FIG. 21 is a diagram illustrating a magnetic transfer method using an edge transfer method.
Figure 22A:
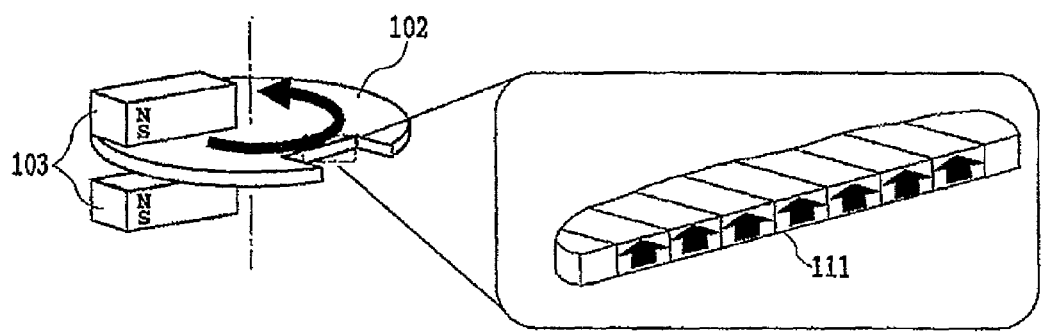
FIGS. 22A and 22B are diagrams illustrating a magnetic transfer method using a bit transfer method.
Figure 22B:
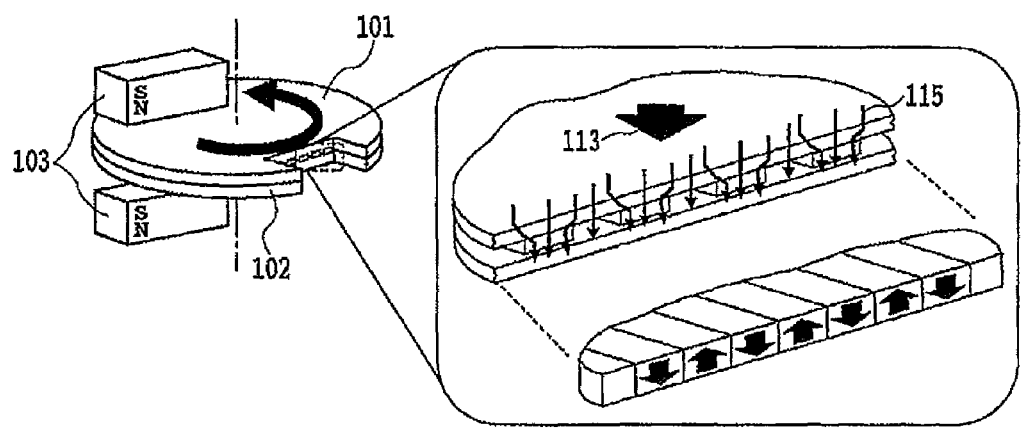

Next, when bar magnets 27 of a length l with pole strengths of $\pm m_1$ (Wb) and $\pm m_2$ (Wb) are aligned with a gap g, as in FIG. 20, the force working between the bar magnets 27 is measured in order to estimate the force working between the upper and lower magnetic field generating units in the one pair of magnetic field generating units.

A force F (N) working between the pole strengths $\pm m_1$ and $\pm m_2$ separated by a distance r (m), in a vacuum and in air, is expressed by the following Equation 1.

$$F = \frac{1}{4\pi\mu_0} \frac{m_1 m_2}{r^2} \quad \text{Equation 1}$$

Therefore, in the condition shown in FIG. 20, by adding together the forces working between each of the pole strengths, it is possible to estimate a force $F_0$ that works overall. Force $F_1$ working between $-m_1$ and $-m_2$ $$F_1 = \frac{1}{4\pi\mu_0} \frac{(-m_1)(-m_2)}{(L+g)^2} \quad \text{Equation 2}$$

Force $F_2$ working between $-m_1$ and $+m_2$ $$F_2 = \frac{1}{4\pi\mu_0} \frac{(-m_1)(m_2)}{(2L+g)^2} \quad \text{Equation 3}$$

Force $F_3$ working between $+m_1$ and $-m_2$ $$F_3 = \frac{1}{4\pi\mu_0} \frac{(m_1)(-m_2)}{g^2} \quad \text{Equation 4}$$

Force $F_4$ working between $+m_1$ and $+m_2$ $$F_4 = \frac{1}{4\pi\mu_0} \frac{(m_1)(m_2)}{(L+g)^2} \quad \text{Equation 5}$$

Force $F_0$ working overall $$F_0 = F_1 + F_2 + F_3 + F_4 \quad \text{Equation 6}$$

In Examples 1 to 3 and in the comparison example, a neodymium magnet is used in the magnetic field generating units, and the surface magnetic flux density is 1 (T). Also, the gap g between the bar magnets 27 is 3.5 mm.

The pole strength (Wb) can be estimated by the surface magnetic flux density (T)×the area (m²). The forces calculated from the above acting on the magnetic field generating units are shown in Table 1. A negative numerical value indicates that it is an attractive force. $u_0 = 4\pi \times 10^{-7}$.

TABLE 1

| | Magnetic Field Generating Unit Length (m) | Magnetic Field Generating Unit Width (m) | Area (m²) | $F_0$ (N) |
|---|---|---|---|---|
| Example 1 | 0.01000 | 0.006 | $6.00 \times 10^{-5}$ | −15.24 |
| Example 2 | 0.00375 | 0.006 | $2.25 \times 10^{-5}$ | −1.91 |
| Example 3 | 0.00750 | 0.006 | $4.50 \times 10^{-5}$ | −8.36 |
| Comparison Example | 0.01500 | 0.006 | $9.00 \times 10^{-5}$ | −35.14 |

From the above, it can be seen that the force working between the upper and lower magnetic field generating units is smaller in Examples 1 to 3 than in the comparison example. That is, according to Table 1, the force $F_0$ acting on the magnetic field generating units can be made approximately one half that of the comparison example in Example 1, approximately one quarter that of the comparison example in Example 3, and approximately one twentieth that of the comparison example in Example 2. Consequently, it is possible to reduce the mechanical rigidity of the magnetic field generating units commensurately, and it is possible to achieve a downsizing of the device.

As heretofore described, according to the invention, by reducing the area of one pair of magnetic field generating units (magnets) for applying a transfer magnetic field, it is possible to reduce the attractive force or repulsive force between the magnetic field generating units, and it is possible to achieve a downsizing of the device. Also, according to the invention, it is possible to carry out the step of applying the magnetic field using the magnetic field generating units and the step of withdrawing the magnetic field generating units from the contact body (the magnetic recording medium) simultaneously and, there being no need to provide the withdrawal step separately, it is possible to shorten the processing time.

What is claimed is:

1. A magnetic transfer method, comprising:
    applying to a contact body a magnetic field, wherein the contact body includes
        a master disk having a magnetic pattern corresponding to preformatted signals, and
        a magnetic recording medium in close contact with the master disk, the magnetic recording medium being a disk, an outer peripheral radius of a transfer region of the magnetic recording medium being designated 'Ro' and an inner peripheral radius of the transfer region being designated 'Ri';
    generating the applied magnetic field by a plurality of pairs of magnetic field generating units, the total number of pairs being designated 'N', wherein
        each adjacent pair of magnetic field generating units of the plurality of pairs is disposed at equal angles centered on a center of rotation of the contact body, and
        each magnetic field generating unit has a length equal to or greater than (Ro−Ri)/N and less than (Ro−Ri) in the radial direction of the magnetic recording medium;
    rotating the contact body during the application of the magnetic field; and
    while the contact body is rotating, moving the plurality of magnetic field generating units parallel to a surface of the contact body, wherein
        each pair of magnetic field generating units of the plurality moves in radial synchrony with all other pairs of the plurality,
        each pair of magnetic field generating units moves along a line disposed from the center of rotation of the contact body to the outer periphery of the contact body, and
        each pair of magnetic field generating units traverses a distance equal to or greater than (Ro−Ri) from a first peripheral side to a second peripheral side of the magnetic recording medium during a time interval in which the contact body rotates at most 360 degrees;
    whereby the preformatted signals are transferred from the master disk to the magnetic recording medium.

2. The magnetic transfer method of claim 1, wherein the magnetic field generating units apply the magnetic field in a perpendicular direction to the contact body.

3. The magnetic transfer method of claim 1, wherein the magnetic field generating units apply the magnetic field to the contact body in a horizontal direction.

4. The magnetic transfer method of claim 1, wherein moving each pair of magnetic field generating units comprises moving each pair substantially from an inner peripheral side of the contact body to an outer peripheral side of the contact body.

5. The magnetic transfer method of claim 1, wherein each pair of magnetic field generating units moves along a straight line disposed radially from the center of rotation of the contact body to the outer periphery of the contact body, whereby in consequence of the straight line movement and the rotation of the contact body, each pair of magnetic field generating units traverses a substantially spiral path along the surface of the contact body.

6. The magnetic transfer method of claim 1, wherein each pair of magnetic field generating units traverses the distance equal to or greater than (Ro−Ri) from the first peripheral side to the second peripheral side during a time interval in which the contact body rotates at most 270 degrees.

7. The magnetic transfer method of claim 1, wherein each magnetic field generating unit of a pair of magnetic field generating units is disposed on an opposing surface of the contact body.

8. A magnetic transfer device that transfers preformatted signals from a master disk to a magnetic recording medium, comprising:
    a rotation drive unit that causes a contact body to rotate, wherein the contact body includes
        (i) the master disk, the master disk having a magnetic material pattern corresponding to the preformatted signals, and
        (ii) the magnetic recording medium, the medium having a disk shape, wherein an outer peripheral radius of a transfer region on the magnetic recording medium being designated 'Ro' and an inner peripheral radius of the transfer region being designated 'Ri',
        wherein the master disk is in close contact with the magnetic recording medium; and
    a plurality of pairs of magnetic field generating units, the number of pairs being designated 'N', wherein
        each adjacent pair of magnetic field generating units of the plurality of pairs is disposed at equal angles centered on a center of rotation of the contact body,
        the plurality of pairs are configured and arranged to apply a magnetic field to the contact body, and
        the magnetic field generating units have a length equal to or greater than (Ro−Ri)/N and less than (Ro−Ri) disposed in a radial direction of the magnetic recording medium; wherein
    the rotation drive unit is configured and arranged to rotate the contact body during the application of the magnetic field;
    the plurality of magnetic field generating units are configured and arranged such that while the contact body is rotating, the plurality of units move parallel to a surface of the contact body, each pair of magnetic field generating units of the plurality configured and arranged to move in radial synchrony with all other pairs of the plurality;
    the plurality of magnetic field generating units are configured and arranged such that while the contact body is rotating, the plurality of units move along a line disposed from the center of rotation of the contact body to the outer periphery of the contact body; and
    the plurality of magnetic field generating units are configured and arranged such that while the contact body is rotating, the plurality of units move at a speed such as to traverse a distance equal to or greater than (Ro−Ri) from a first periphery side to a second periphery side of the magnetic recording medium while the contact body rotates at most 360 degrees;

whereby the magnetic transfer device is configured and arranged to transfer the preformatted signals from the master disk to the magnetic recording medium.

9. The magnetic transfer device of claim 8, wherein the magnetic field generating units are configured and arranged to apply the magnetic field in a perpendicular direction to the contact body.

10. The magnetic transfer device of claim 8, wherein the magnetic field generating units are configured and arranged to apply the magnetic field in a horizontal direction to the contact body.

11. The magnetic transfer device of claim 8, wherein each pair of magnetic field generating units is configured and arranged to move from an inner peripheral side of the contact body to an outer peripheral side of the contact body.

12. The magnetic transfer device of claim 8, wherein each pair of magnetic field generating units is configured and arranged to move along a straight line disposed radially from the center of rotation of the contact body to the outer periphery of the contact body, whereby in consequence of the straight line movement and the rotation of the contact body, each pair of magnetic field generating units is configured and arranged to traverse a substantially spiral path along the surface of the contact body.

13. The magnetic transfer device of claim 8, wherein each pair of magnetic field generating units is configured and arranged to traverse the distance equal to or greater than (Ro−Ri) from the first peripheral side to the second peripheral side during a time interval in which the contact body rotates at most 270 degrees.

14. The magnetic transfer device of claim 8, wherein each magnetic field generating unit of a pair is disposed on an opposing surface of the contact body.

15. A magnetic transfer method, comprising:
applying a magnetic field to a master disk and a magnetic recording disk, wherein
the master disk has a magnetic pattern corresponding to preformatted signals,
the magnetic recording disk is in close contact with the master disk, wherein the magnetic recording disk and the master disk have a common center of rotation and are coupled for rotation, and
an outer peripheral radius of a transfer region on the magnetic recording disk is designated 'Ro' and an inner peripheral radius of the transfer region is designated 'Ri';
generating an applied magnetic field by a plurality of pairs of magnetic field generating units, the total number of pairs being designated 'N', wherein
each adjacent pair of magnetic field generating units of the plurality of pairs is disposed at equal angles centered on a shared center of rotation of the master disk and the magnetic recording disk, and
each magnetic field generating unit has a length equal to or greater than (Ro−Ri)/N and less than (Ro−Ri) disposed in the radial direction of the magnetic recording disk,
rotating the coupled master disk and magnetic recording disk during the application of the magnetic field; and
while the coupled master disk and magnetic recording disk are rotating, moving the plurality of magnetic field generating units along a surface of the coupled master disk and magnetic recording disk, wherein
each magnetic field generating unit moves in radial synchrony with all other magnetic field generating units, and
each pair of magnetic field generating units traverses a distance equal to or greater than (Ro−Ri) from a first peripheral side to a second peripheral side of the magnetic recording disk during a time interval in which the contact body rotates at most 540 degrees;
whereby the preformatted signals are transferred from the master disk to the magnetic recording disk.

16. The magnetic transfer method of claim 15, wherein the magnetic field generating units apply the magnetic field in a direction perpendicular to the coupled master disk and magnetic recording disk.

17. The magnetic transfer method of claim 15, wherein the magnetic field generating units apply the magnetic field in a horizontal direction to the coupled master disk and magnetic recording disk.

18. The magnetic transfer method of claim 15, wherein moving each pair of magnetic field generating units comprises moving each pair from an inner peripheral side of the coupled master disk and magnetic recording disk to an outer peripheral side of the coupled master disk and magnetic recording disk.

\* \* \* \* \*